United States Patent [19]
Dimperio et al.

[11] Patent Number: 5,142,667
[45] Date of Patent: Aug. 25, 1992

[54] RESOURCE AND MEMORY MANAGEMENT ALGORITHMS FOR ELECTRIC PRINTING AND ELECTRONIC REPROGRAPHIC SYSTEMS

[75] Inventors: Richard R. Dimperio, Rochester; Bob Ho; Abde Kapadia, both of Webster; Thomas G. Brucker, Rochester, all of N.Y.

[73] Assignee: Xerox Corporation, Stamford, Conn.

[21] Appl. No.: 589,608

[22] Filed: Sep. 28, 1990

[51] Int. Cl.⁵ .......................................... G06K 15/00
[52] U.S. Cl. .................................. 395/115; 395/105
[58] Field of Search ............... 395/115, 114, 101, 105; 358/404; 364/930 MS File, 235 MS File; 355/202, 204; 340/750, 789, 798, 799

[56] References Cited

U.S. PATENT DOCUMENTS 4,241,420 12/1980 Fish et al.
4,399,503 8/1983 Hawley.
4,445,195 4/1984 Yamamoto.
4,511,928 4/1985 Colomb.
4,527,752 7/1985 Donohue et al. .................. 364/900
4,894,646 1/1990 Ryman.
4,910,611 3/1990 Cok.

Primary Examiner—Arthur G. Evans
Attorney, Agent, or Firm—Oliff & Berridge

[57] ABSTRACT

A printing system having an electronic sub system loaded with control software which controls scanning, image storing and the printing operations of the printing system. The control software schedules the bandwidth of disk storage and swaps images from a storage disk to a memory so that a desired image will be in memory when the printing of that image is requested. The system utilizes resource management and/or memory management software to realize improved job turn around time and to reduce pitch skips.

38 Claims, 26 Drawing Sheets

PERCENTAGE PRINT PITCH SKIPS AS A FUNCTION OF DISK BANDWIDTH
AND MEMORY

AVERAGE JOB TURN-AROUND TIME (MINUTES) AS A FUNCTION OF DISK BANDWIDTH AND MEMORY

| DISK BANDWIDTH (MBITS/SEC) / ESS MEMORY (MBYTES) | TURN-AROUND TIME % DIFFERENCE | PERCENTAGE PITCH SKIPS % DIFFERENCE |
|---|---|---|
| 6.5/16 | 3.7 | 17.1 |
| 6.5/24 | 11.3 | 55.1 |
| 6.5/32 | 4.9 | 50.8 |
| 6.5/48 | .04 | 19.7 |
| 8.5/16 | 5.3 | 53.2 |
| 8.5/24 | 3.5 | 52.3 |
| 8.5/32 | 1.3 | 23.6 |
| 8.5/48 | 0.3 | 6.1 |
| 12/16 | 1.8 | 77.3 |
| 12/24 | 1.1 | 52.7 |
| 12/32 | 1.2 | 55.1 |
| 12/48 | 0.1 | 4.2 |

*FIG. 19*

| ESS MEMORY (MEGA BITS) | DISK TRANSFER RATE (MEGA BITS/SEC) | MOST RECENTLY USED SEGMENT SWAPPING ALGORITHM | | | MOST RECENTLY USED AND SAVED PAGE SWAPPING ALGORITHM | | | TAT RATIO MRUPAGE /MRUSEG | PRINT PITCH SKIP RATIO MRUPAGE /MRUSEG |
|---|---|---|---|---|---|---|---|---|---|
| | | TAT (MIN) | AVG. PRINT PITCH SKIPS PER JOB | % PRINT PITCH SKIPS | TAT (MIN) | AVG. PRINT PITCH SKIPS PER JOB | % PRINT PITCH SKIPS | | |
| 16 | 6.5 | 6.677 | 11.160 | 6.30% | 6.803 | 23.231 | 12.27% | 1.019 | 2.082 |
| 20 | 6.5 | 5.985 | 5.376 | 3.13% | 6.093 | 10.858 | 6.14% | 1.018 | 2.020 |
| 24 | 6.5 | 5.903 | 3.992 | 2.35% | 5.910 | 7.036 | 4.06% | 1.002 | 1.765 |
| 32 | 6.5 | 5.843 | 2.588 | 1.53% | 5.843 | 4.364 | 2.56% | 1.000 | 1.686 |
| 48 | 6.5 | 5.813 | 2.052 | 1.22% | 5.813 | 3.431 | 2.02% | 1.000 | 1.672 |
| 64 | 6.5 | 5.807 | 1.780 | 1.06% | 5.807 | 2.962 | 1.75% | 1.000 | 1.664 |
| 16 | 7.5 | 6.035 | 5.428 | 3.16% | 6.127 | 10.903 | 6.16% | 1.015 | 2.009 |
| 20 | 7.5 | 5.873 | 3.320 | 1.96% | 5.880 | 5.846 | 3.40% | 1.001 | 1.761 |
| 24 | 7.5 | 5.873 | 2.324 | 1.38% | 5.838 | 3.931 | 2.31% | 1.000 | 1.691 |
| 32 | 7.5 | 5.808 | 1.736 | 1.03% | 5.810 | 2.817 | 1.67% | 1.000 | 1.622 |
| 48 | 7.5 | 8.797 | 1.428 | 0.85% | 5.797 | 2.290 | 1.36% | 1.000 | 1.604 |
| 64 | 7.5 | 5.795 | 1.332 | 0.79% | 5.795 | 2.140 | 1.27% | 1.000 | 1.607 |

FIG. 20

| ESS MEMORY (MEGA BITS) | DISK TRANSFER RATE (MEGA BITS/SEC) | MOST RECENTLY USED SEGMENT SWAPPING ALGORITHM | | | MOST RECENTLY USED AND SAVED PAGE SWAPPING ALGORITHM | | | TAT RATIO MRUPAGE /MRUSEG | PRINT PITCH SKIP RATIO MRUPAGE /MRUSEG |
|---|---|---|---|---|---|---|---|---|---|
| | | TAT (MIN) | AVG. PRINT PITCH SKIPS PER JOB | % PRINT PITCH SKIPS | TAT (MIN) | AVG. PRINT PITCH SKIPS PER JOB | % PRINT PITCH SKIPS | | |
| 16 | 8.5 | 5.860 | 3.140 | 1.85% | 5.865 | 5.441 | 3.17% | 1.001 | 1.733 |
| 20 | 8.5 | 5.822 | 2.080 | 1.27% | 5.827 | 3.618 | 2.13% | 1.001 | 1.739 |
| 24 | 8.5 | 5.798 | 1.464 | 0.87% | 5.798 | 2.379 | 1.41% | 1.000 | 1.625 |
| 32 | 8.5 | 5.790 | 1.324 | 0.79% | 5.792 | 2.201 | 1.31% | 1.000 | 1.662 |
| 48 | 8.5 | 5.785 | 1.116 | 0.67% | 5.787 | 1.848 | 1.10% | 1.000 | 1.656 |
| 64 | 8.5 | 5.785 | 1.116 | 0.67% | 5.787 | 1.848 | 1.10% | 1.000 | 1.656 |
| 16 | 12.0 | 5.777 | 0.460 | 0.28% | 5.778 | 0.781 | 0.47% | 1.000 | 1.698 |
| 20 | 12.0 | 5.773 | 0.404 | 0.24% | 5.775 | 0.687 | 0.41% | 1.000 | 1.700 |
| 24 | 12.0 | 5.772 | 0.400 | 0.24% | 5.773 | 0.674 | 0.40% | 1.000 | 1.685 |
| 32 | 12.0 | 5.772 | 0.400 | 0.24% | 5.772 | 0.634 | 0.38% | 1.000 | 1.585 |
| 48 | 12.0 | 5.772 | 0.400 | 0.24% | 5.772 | 0.634 | 0.38% | 1.000 | 1.585 |
| 64 | 12.0 | 5.772 | 0.400 | 0.24% | 5.772 | 0.634 | 0.38% | 1.000 | 1.585 |

*FIG. 21*

| ESS MEMORY (MEGA BITS) | SEQUENTIAL LIMITED SEGEMENT SWAPPING ALGORITHM % PRINT PITCH SKIPS | MOST RECENTLY USED PAGE SWAPPING ALGORITHM % PRINT PITCH SKIPS |
|---|---|---|
| 16 | 6.22% | 12.27% |
| 20 | 3.27% | 6.14% |
| 24 | 2.36% | 4.06% |
| 32 | 1.51% | 2.56% |
| 48 | 1.22% | 2.02% |
| 64 | 1.06% | 1.75% |

*FIG. 25*

RESOURCE AND MEMORY MANAGEMENT ALGORITHMS FOR ELECTRIC PRINTING AND ELECTRONIC REPROGRAPHIC SYSTEMS

MICROFICHE APPENDIX

The present application has 11 microfiche Appendices A-K containing 11 microfiche and 107 frames.

BACKGROUND OF THE INVENTION

1. Field of the Invention

The present invention pertains to resource management and memory management algorithms for use with electronic printing and electronic reprographic systems. The resource management algorithms are for optimally managing and allocating page memory and disk storage of a printer. Three scheduling algorithms are used: an offset algorithm, for allowing a small period of time (pitches) between image request time and print time; an advanced scheduling algorithm, for scheduling a disk as necessary to retrieve the images in a print set prior to printing by scheduling a certain number of pages ahead; a consecutive set scheduling algorithm, which is a modification of the advanced scheduling algorithm in which memory usage and disk are scheduled for consecutive sets to reduce the number of skips between sets. The invention further pertains to a group of memory managements swapping algorithms from which can be selected an optimum strategy dependent upon the particular resources of memory and disk bandwidth available for reducing pitch skips and improving turn around time.

2. Discussion of the Background and Related Art

Data management systems and techniques for improving throughput in such systems are disclosed in U.S. Pat. No. 4,241,420 to Fish et al. and in U.S. Pat. No. 4,339,503 to Hawley. Fish et al. disclose a controller for supervising the transfer of data between a disk memory and RAM memory in order to avoid delays in transfer. The Hawley patent discloses a controller for controlling the transfer of data between a disk memory and a high-speed limited capacity RAM memory.

Further, the prior art discloses a number of references relating to memory management systems for electronic printers. U.S. Pat. No. 4,910,611 to Cok discloses a method for interactive image processing wherein various operations are carried out upon images. In order to increase efficiency, each command is analyzed to determine which parts of the image will be required to complete the command. In addition, memory transfers between main memory and an auxiliary disk memory are avoided by using memory swapping. U.S. Pat. No. 4,445,195 to Yamamoto discloses a recording system of variable length picture information wherein a picture image is scanned into a device and stored on a disk. The picture can then be retrieved from memory so that it can be printed. The length of a particular picture element is stored along with the actual data so that it is easier to determine the length of the picture. U.S. Pat. No. 4,511,928 to Colomb discloses a system and method for high quality image reproduction wherein an image can be scanned and stored. Two processors are provided for controlling all of the operations of the copier including the print-while-store function.

U.S. Pat. No. 4,894,646 to Ryman discloses an image processing system and method for manipulating images in an image processing system where each image in the system is subdivided into a plurality of sub-images which are processed independently of one another. The Ryman patent relates to the efficient processing of large digital images where the image storing requirements exceed the capacity of the memory of the processor on which the image data is being processed or in which the addressing capability of the processor is inadequate to handle the image data or both. The images stored in the system are maintained in a secondary store and only portion of the image are available for manipulation at any one time in a primary store. The manipulation of some images is determined by a modified Least Recently Used algorithm which minimizes data swaps between the primary and secondary stores.

SUMMARY OF THE INVENTION

Accordingly, one object of the present invention is to provide a device which optimally manages and allocates page memory and disk storage of a printer.

Yet another object is to optimally manage and allocate page memory and disk storage by an offset algorithm.

Another object of the present invention is to optimally manage and allocate page memory and disk storage by an advanced scheduling algorithm.

Yet another object of the present invention is to optimally manage and allocate page memory by a consecutive set scheduling algorithm.

Yet another object of the present invention is to provide a group of memory management swapping algorithms from which can be selected an optimum strategy dependent upon the particular resources of memory and disk bandwidth available for reducing pitch skips and improving turn around time.

These and other objects and advantages of the present invention are provided for an electronic reprographic system having input/output means connected to memory means. The memory means comprises a scan buffer means and a print buffer means, the print buffer means being connected to a storage means. The invention further comprises a memory/disk bandwidth means which is interfaced with the input and output means, a user interface means, a long term scheduling table means, and a resource data base means.

The system further comprises a scan manager means which is interfaced with a system manager, a long term scheduling table means, a scan short term scheduling means, a resource manager means, and the input means. The invention further comprises a print manager means interfaced with the output means, the system manager means, the long term scheduling table means and the resource manager means.

The resource management means is interfaced with a disk manager means, a scan manager means, a print manager means, a print short term scheduler means, a resource data base means, and a print long term scheduling means. The print long term scheduling means is interfaced with the long term scheduling table means and a print memory swapper means.

Three scheduling algorithms are used in conjunction with the hardware of the present invention. One is an offset algorithm, the other is an advanced scheduling algorithm, and the third is a consecutive set scheduling algorithm. An electronic printing and/or reprographic system can be programmed to utilize one, two, or all of the scheduling algorithms.

BRIEF DESCRIPTION OF THE DRAWINGS

The invention will be described in detail with reference to the following drawings in which like reference numerals refer to like elements and wherein:

FIG. 19 is a table which compares the disk band/width with turn-around time percentage difference and percentage pitch skips percentage difference;

FIG. 20 is a table which includes a comparison of the most recently used segment swapping algorithm with the most recently used and saved page swapping algorithm;

FIG. 21 is a table which compares the most recently used segment swapping algorithm and the most recently used and saved page swapping algorithm at disk transfer rates which differ from those disk transfer rates shown in the table of FIG. 20;

FIG. 25 is a table comparing the percentage of print pitch skips for the sequential limited segment swapping algorithm and the most recently used page swapping algorithm at various memory megabyte levels;

DETAILED DESCRIPTION OF THE PREFERRED EMBODIMENTS

A. The System

Figure 1:
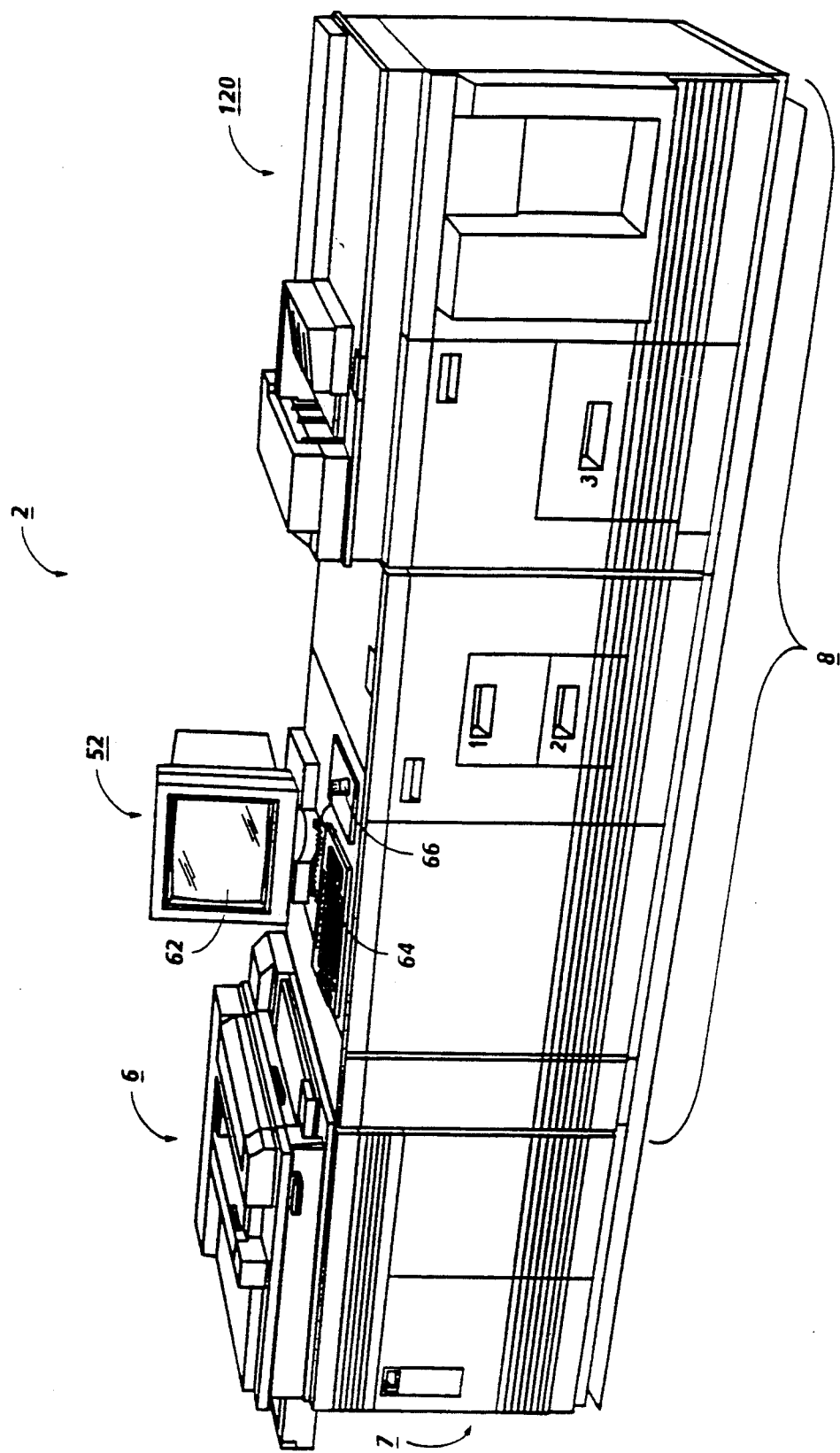
FIG. 1 is a view depicting an electronic printing system in accordance with the present invention.
Figure 2:
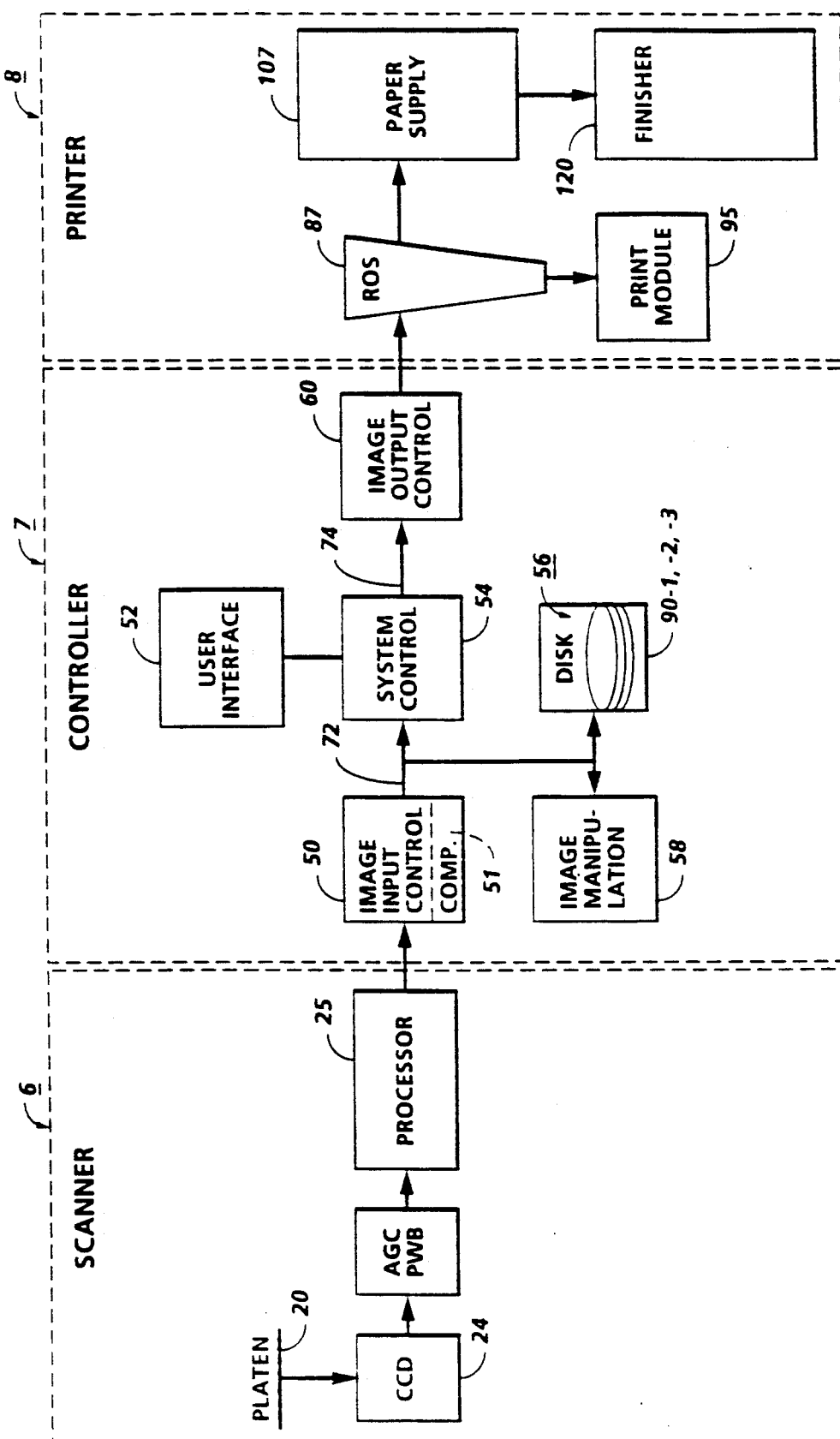
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
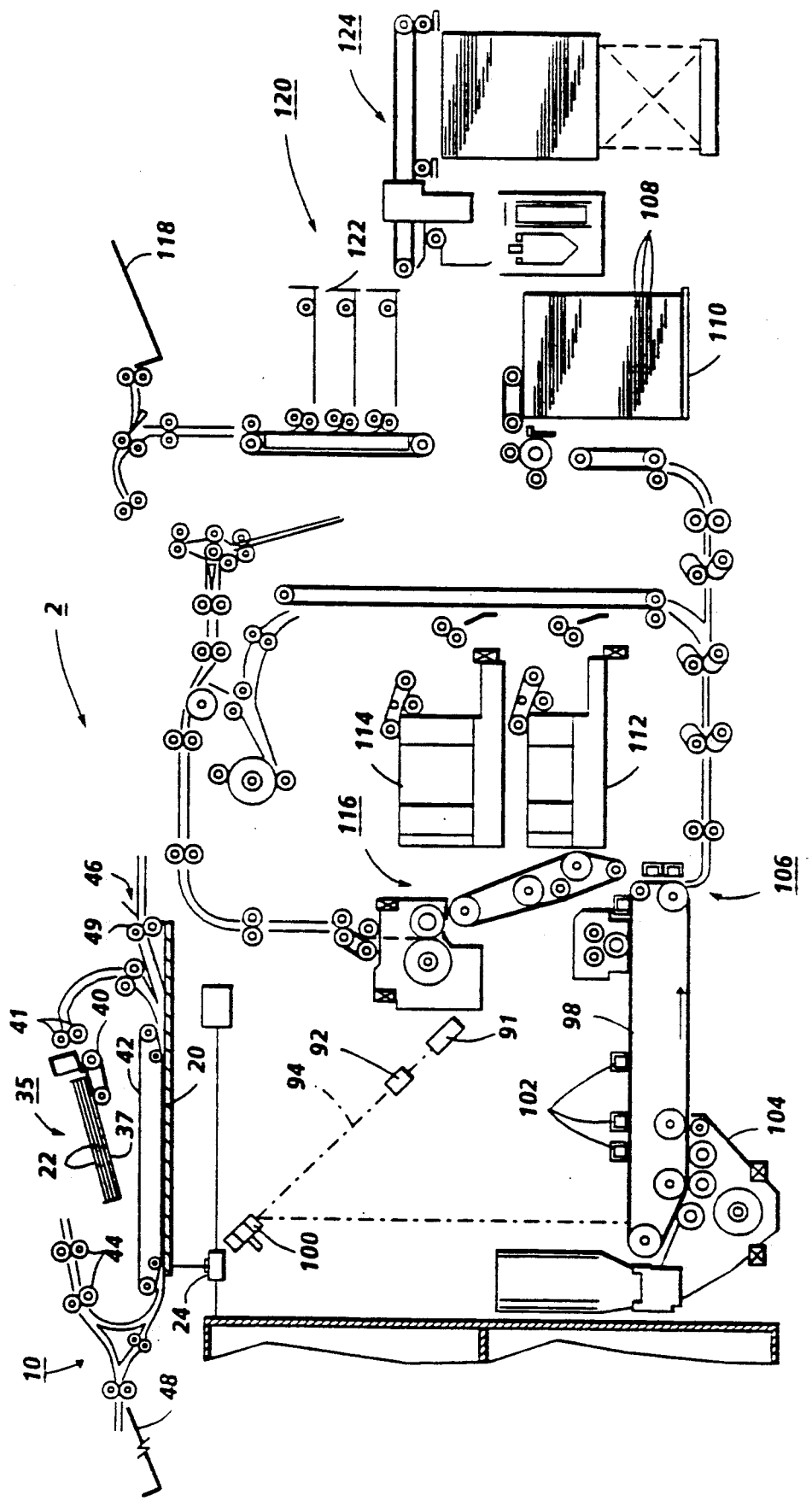
FIG. 3 is a plan view illustrating the principal mechanical components of the printing system shown in FIG. 1.
Figure 4:
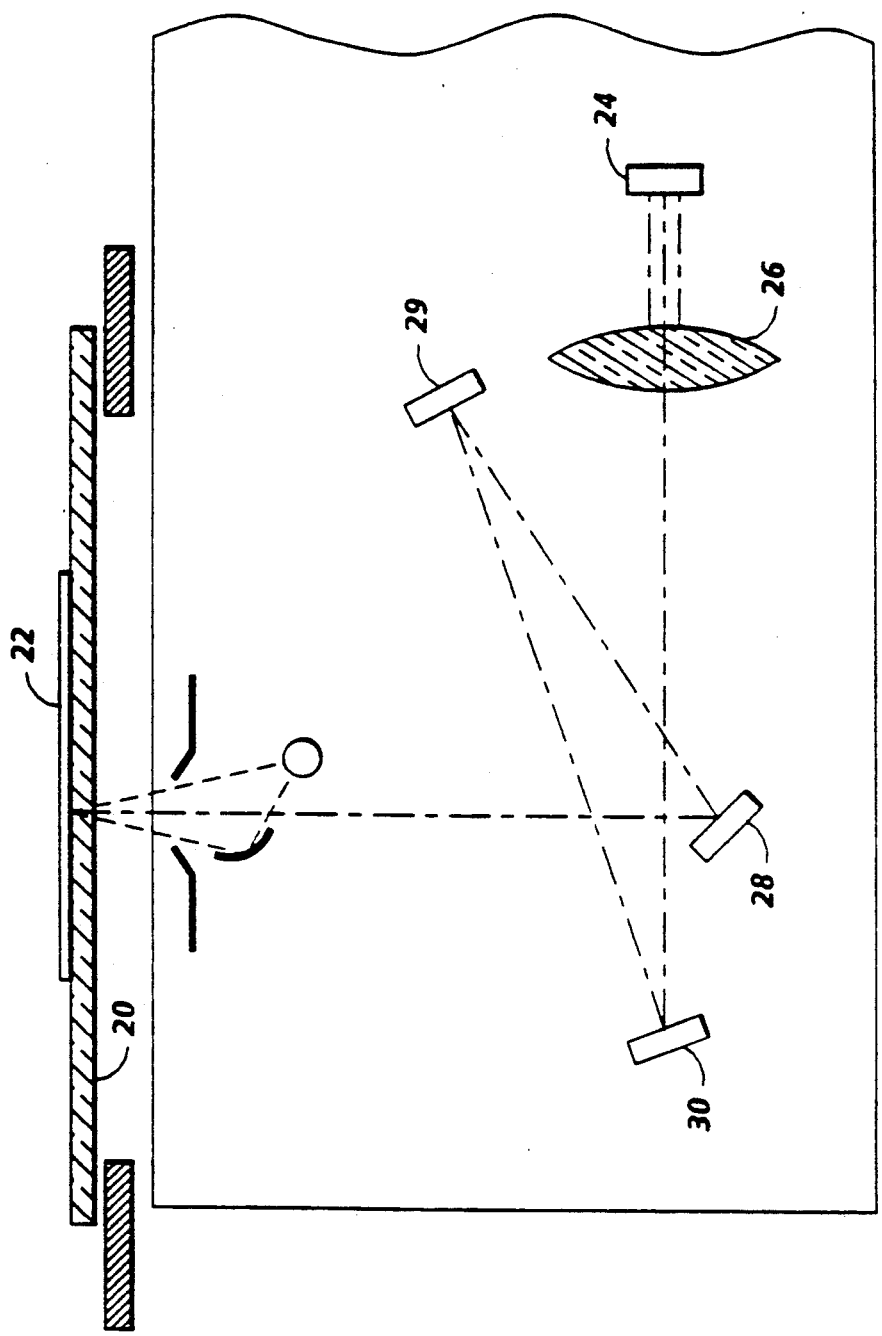
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADH) 35 operable in either a Recirculating document Handling (RDH) mode or a Semi-Automatic document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 87 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books. The printer may include a memory (not shown) for storage of document data to be printed.

Referring to FIGS. 2 and 5, controller section 7 is for explanation purposes, divided into an image input controller 50, User Interface (UI) 52, system controller or ESS 54, main memory 56, image manipulation section 58, and image output controller 60.

Figure 5A:
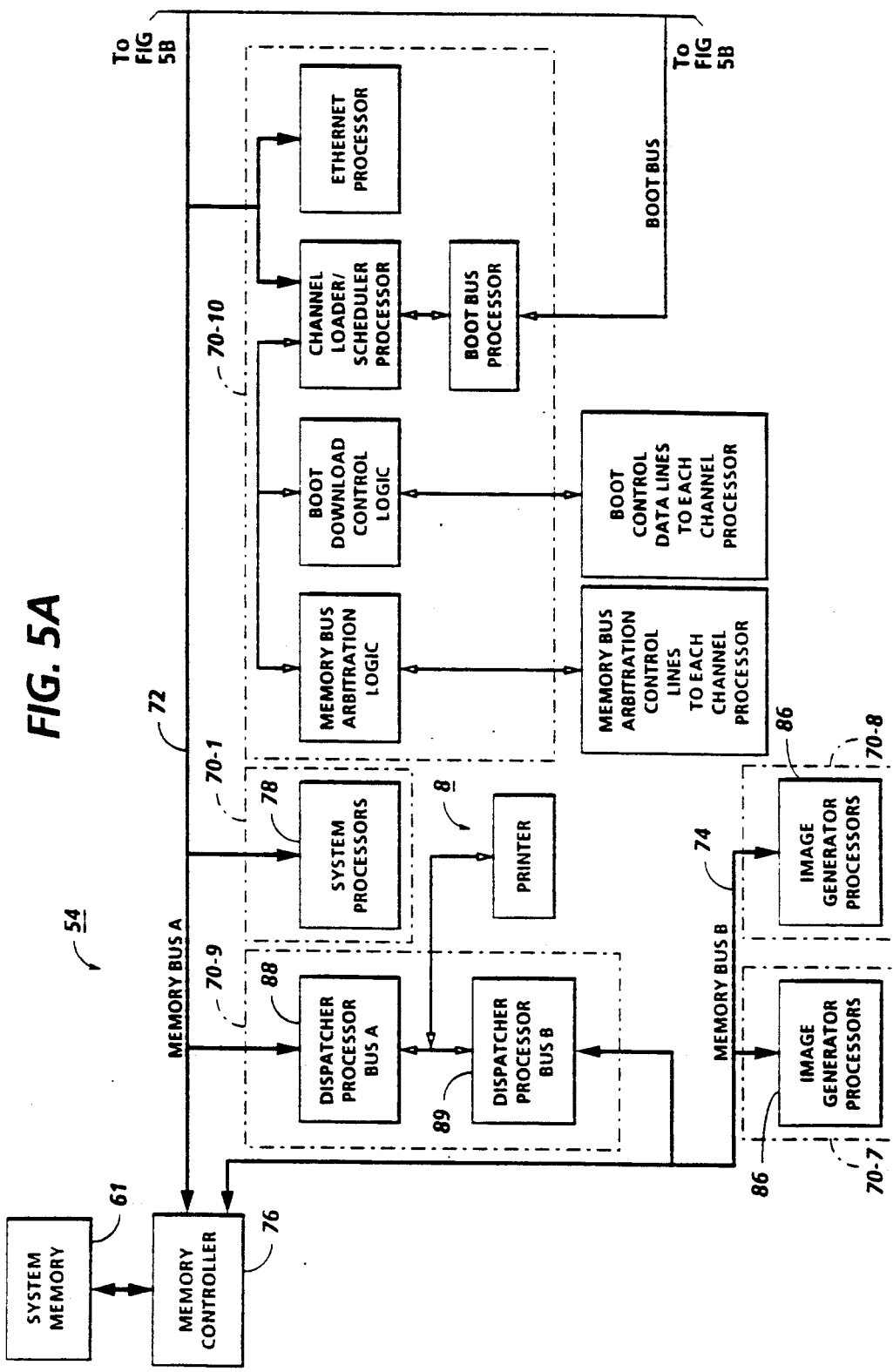
FIGS. 5A, 5B and 5C comprise a schematic block diagram showing the major parts of the control section for the printing system shown in FIG. 1.
Figure 5B:
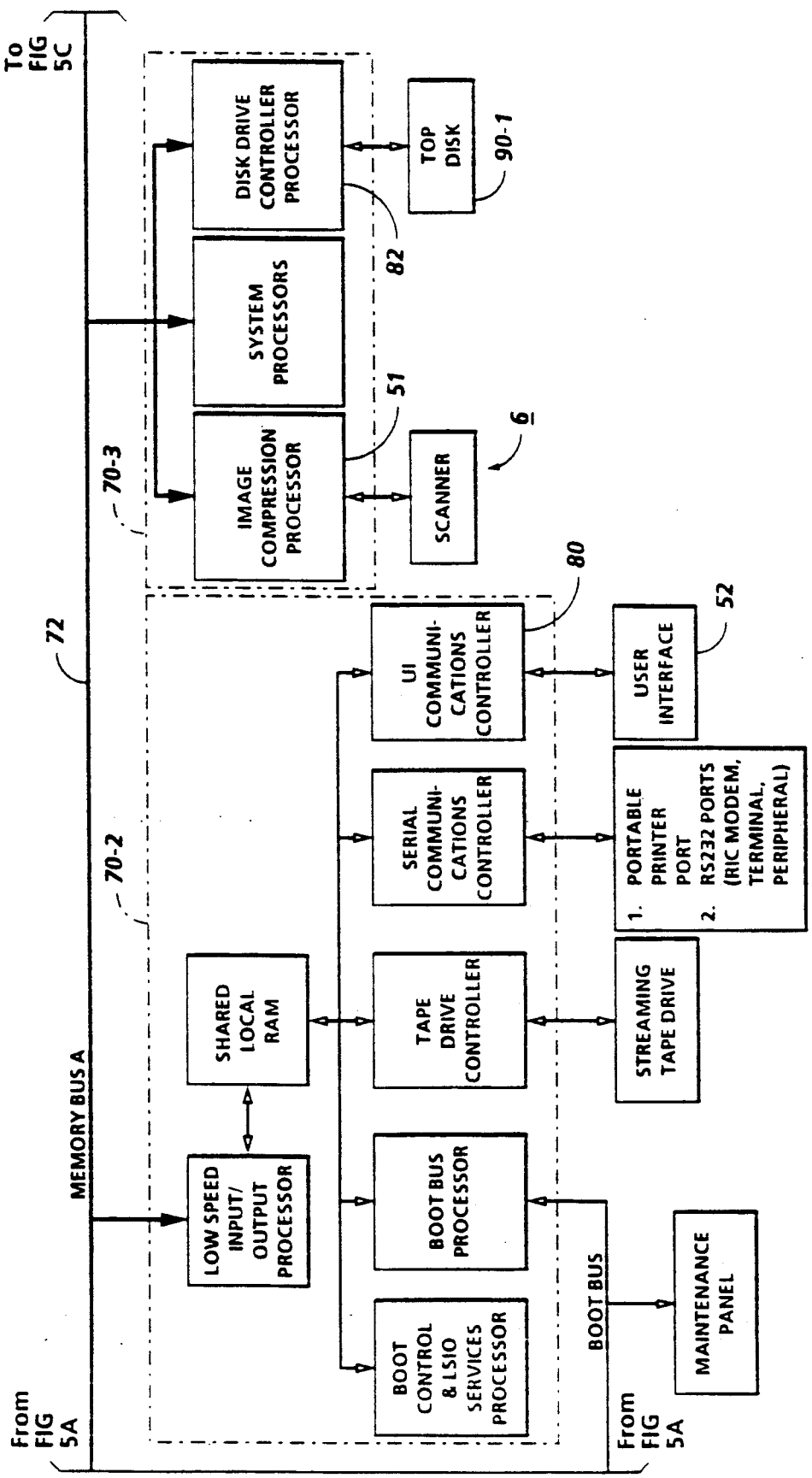
Figure 5C:
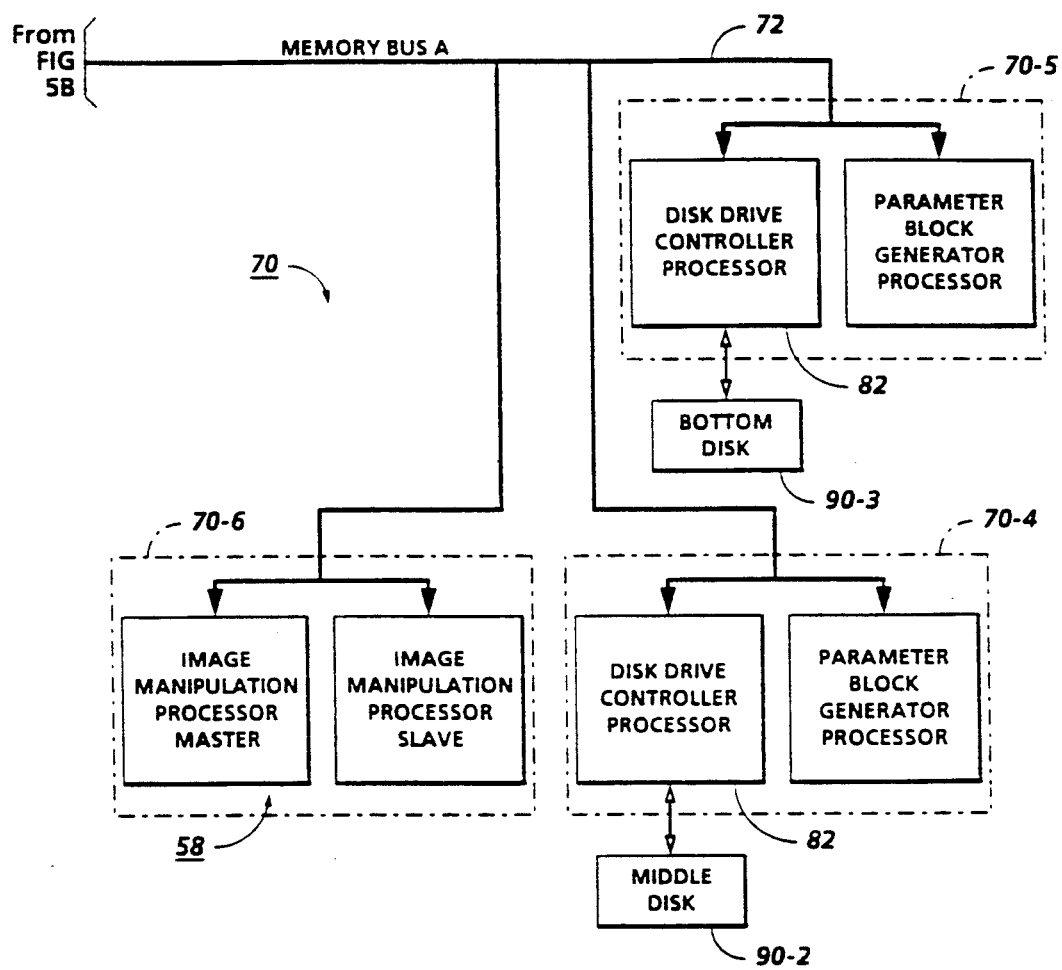

Referring particularly to FIGS. 5a-5c, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52 PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5a). Following this, the data is output by dispatch processors 88, 89 on PWB 70-9 to printer section 8. Image data sent to printer section 8 for printing is normally purged from memory 56 to make room for new image data.

Figure 6:
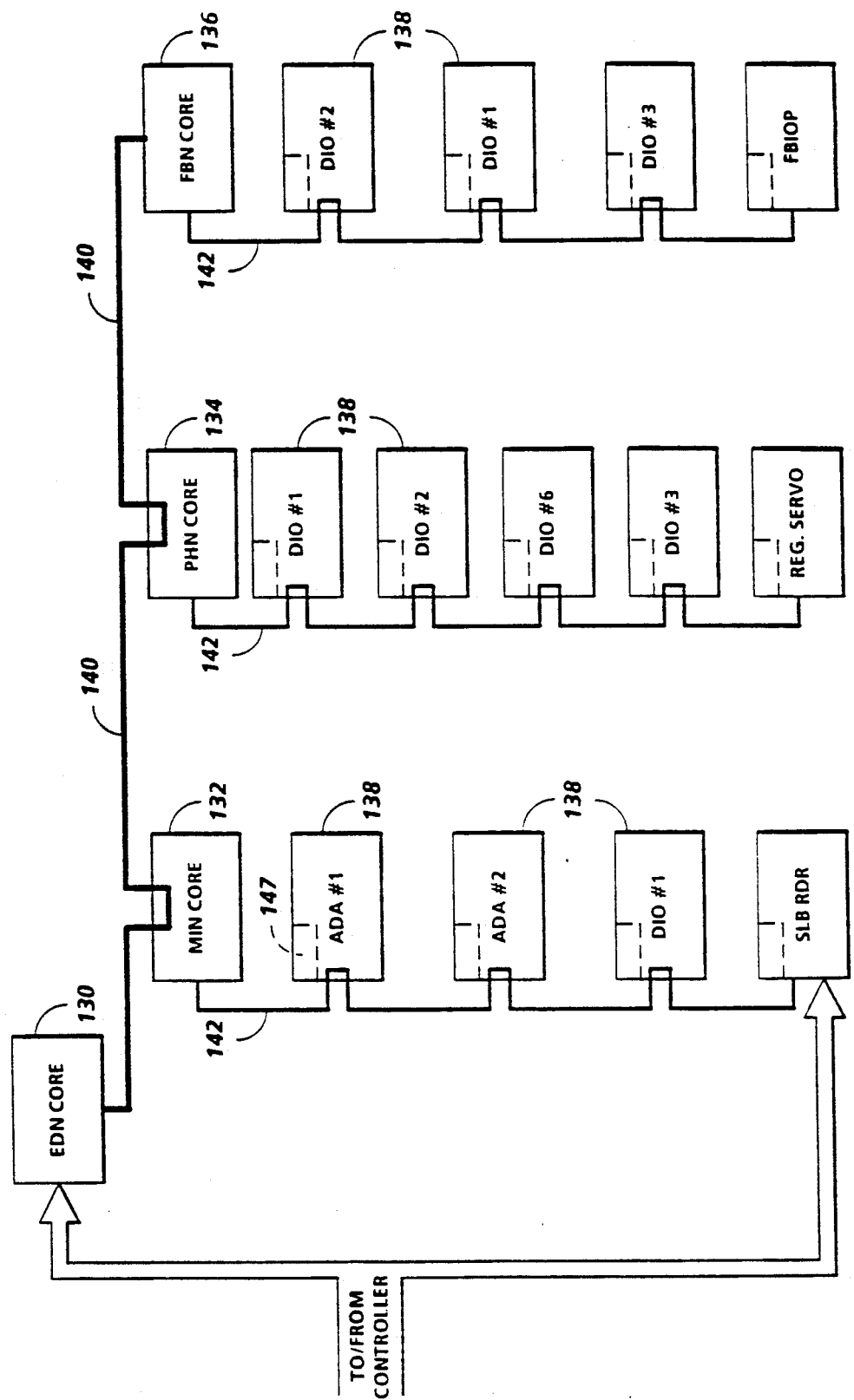
FIG. 6 is a block diagram of the Operating System, together with Printed Wiring Boards and shared line connections for the printing system shown in FIG. 1.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and non-volatile memory NVM memory types are resident at various locations within system 2.

Figure 7:
FIG. 7 is a view depicting an exemplary job programming ticket and job scorecard displayed on the User Interface (UI) touchscreen of the printing system shown in FIG. 1.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

B: Resource Management

In the following discussion, the controller 7 is referred to as the electronic sub-system (ESS), the scanner as an image input terminal (IIT), and the printer as an image output terminal (IOT).

Efficient resource management, sufficient electronic sub-system (ESS) memory and sufficient disk bandwidth are three key system parameters related to optimizing the performance of electronic reprographic (ER) and electronic printing systems. System performance is improved by minimizing the average turn-around time per job thus increasing job throughput and by minimizing the average percentage of print pitch skips per job thereby efficiently using the consumables of the machine.

A pitch skip is a time when the system is in full execution mode (charging and discharging of the photoreceptor) and yet a sheet of paper is not being imaged. Minimizing the number of print pitch skips and/or maintaining the number of print skips within a predetermined range is one feature in improving turn-around time and efficiently using the consumables of the machine.

Figure 8:
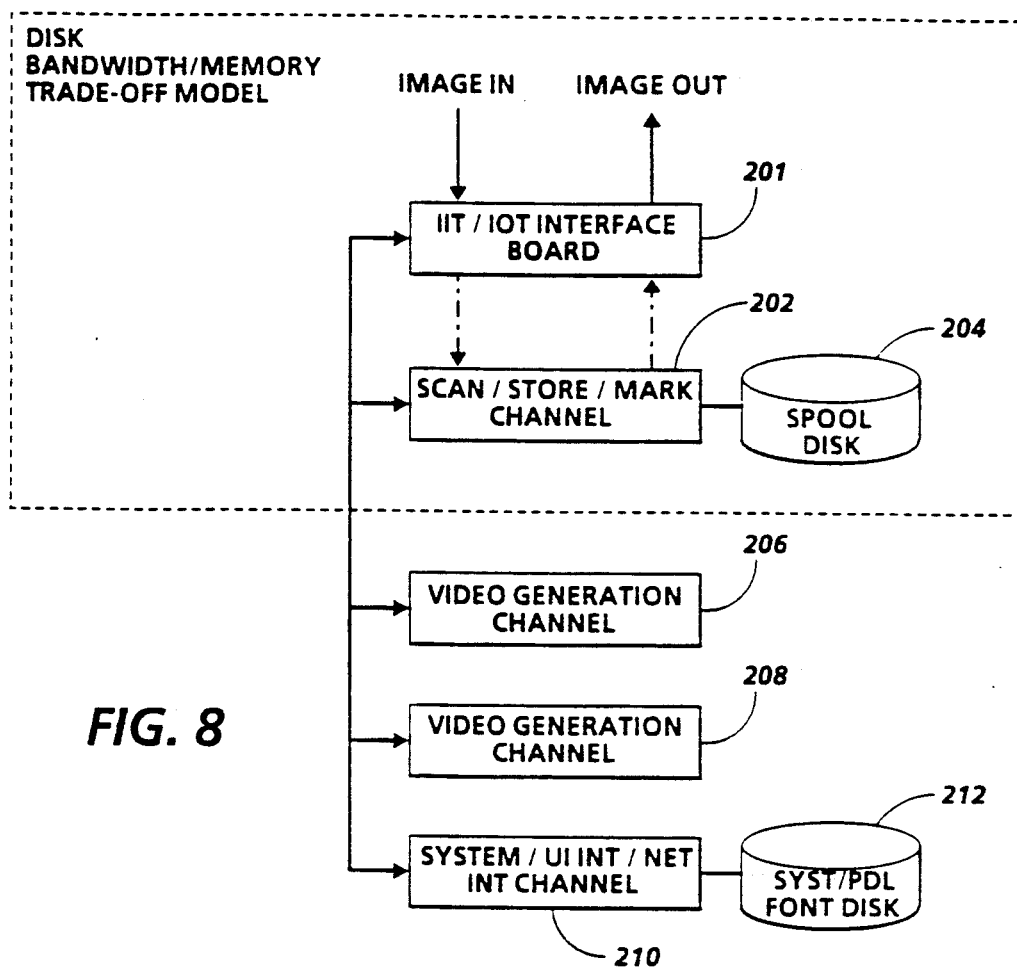
FIG. 8 is a schematic block diagram of a system which was used as one model for the present invention.

The ER system configuration used in modelling the present invention was the scan/mark portion of the system shown in FIG. 8. The basic ESS architecture modelled consists of a limited pool of memory coupled with a scanner (6) or input device (IIT), a printer (8) or output device (IOT), and a rigid spool disk. All four components are managed by the resource manager even though the input and output devices and the disk drive have their own controllers to carry out their specific functions. For example, although the resource manager does not control the scanner in terms of mechanically scanning a document, it does restrict when the scanner can begin scanning by not providing it enough memory to begin operating.

With reference to FIG. 8, ESS 200 has an IIT/IOT interface board 201 interfaced with a scan/store/mark channel 202 which is connected to spool disk 204. ESS 200 is further connected to video generation channel 206, video generation channel 208 and channel 210 which is connected to font disk 212.

One function of the ESS in modeling the present invention is to allow the system to accept and execute scan/print jobs. The three basic steps of the scan/print function are 1) scan the set of originals into memory, 2) store each original as a compressed bitmap onto the spool disk, and 3) print the desired number of copies of the set of originals. The resource management algorithms have been developed to execute each of the three steps concurrently. Specifically, the concurrency of the three steps allows the system to store images to disk and print images while scanning images. Note that because the speeds of the input and output devices may be equivalent, printing of the first image may begin as soon as that original has been scanned into memory. For tests conducted, the input device functioned at a rate of 100 images per minute, while the output device functioned at a rate of 100 pages per minute. It is noted however, that the invention is applicable to systems wherein the printer operates at a rate faster than the scanning rate.

Because of the limited amount of memory in the system, there comes a point in time when the system requires an image, not currently residing in memory but stored on the spool disk, to be in memory, and there is not enough available memory to hold the compressed bit map form of the image. The resource manager must then decide which of the pages currently in memory would be best to remove from memory to make room for the incoming image. The goal here is to remove an image which will have little or no effect on performance.

Also, the ESS may not be able to provide the IOT with the required image for printing because of a combination of the speed of the disk and a poorly compressed page. There may not be sufficient disk bandwidth to bring poorly compressed pages into memory in time for printing. Therefore, each job may incur a certain number of print pitch skips.

To minimize print pitch skips, the minimum required resources and the optimal strategy to manage those limited resources needs to be determined. According to previous studies, the possible ranges of memory size and disk bandwidth were estimated. The six selected disk bandwidths were: 6.5, 7.5, 8.5, 12, 13, and 15 Mbits/sec. The eight memory sizes selected were: 16, 20, 24, 32, 48, 64, 96, and 128 Mbytes. The model was run for 48 different disk bandwidth/memory configurations.

The model is made up of two primary software routines which are called by the resource manager to manipulate system resources. These software routines are referred to as the Long Term Scheduler (LTS) and the Short Term Scheduler (STS). See Appendices A and B, respectively.

The two major tasks performed by the LTS are: 1) minimize turn-around time and the total number of print skips for each job. This is done by scheduling the required disk bandwidth and ESS memory for a group of images in advance. Using the memory status, bandwidth utilization, size of each image file, and number of originals the LTS can reduce the print skips to a minimum level; and 2) Ensure that there is enough memory left to perform concurrent scanning and printing. Unfortunately, the LTS cannot know when the next job is going to request the IIT, nor the size of each image of the next job. Consequently, a scan buffer is provided with a size sufficient to accommodate a 2:1 compression ratio, image file.

The two primary tasks performed by the STS are: 1) ensure that the scheduled image file has been loaded into the ESS print buffer before printing starts for this image. If not, then a print skip(s) is required for this page; and 2) attempt to provide concurrent scan/print by granting the next available disk bandwidth to the IIT.

C. Results

The system model included concurrent scan/print functions, an automatic document handler (ADH) capacity of 100 originals for simplex → simplex printing, and a spooling disk large enough to hold all jobs currently in the system. The average compression ratio for scanned images was 10:1 with a worst case compression ratio of 2:1. A 2:1 compression ratio means that an image is able to be stored in memory utilizing half as many bits as the original. A 10:1 compression ratio means that an image is able to be stored in memory using 1/10 the number of bits as the original. (An original has 600 by 600 spots per inch on an 8½ by 11 piece of paper).

The results below are based on running 250 jobs at 360K average monthly copy volume, which is approximately 1 week worth of jobs. Arrival time of jobs, compression ratio of pages, job type, number of originals, number of copies and all other job demographic information were generated using Monte Carlo techniques.

The Disk Bandwidth/Memory trade-off model consisted of a 100 ppm scanner and a 100 ppm printer. All jobs consisted of A4 paper running in simplex to simplex mode. The average number of originals per job was 10 and the average number of copies per job was 40. The average runlength per job was 166 impressions.

The study demonstrated that at the 12 mbit/sec disk bandwidth level average job turn-around time (TAT) is 5.75 minutes for any amount of memory greater than 16 megabytes (mbytes). For this configuration there were approximately 0.1% average print pitch skips per job. This was well within the target for print pitch skips which was 2% per job.

Figure 9:
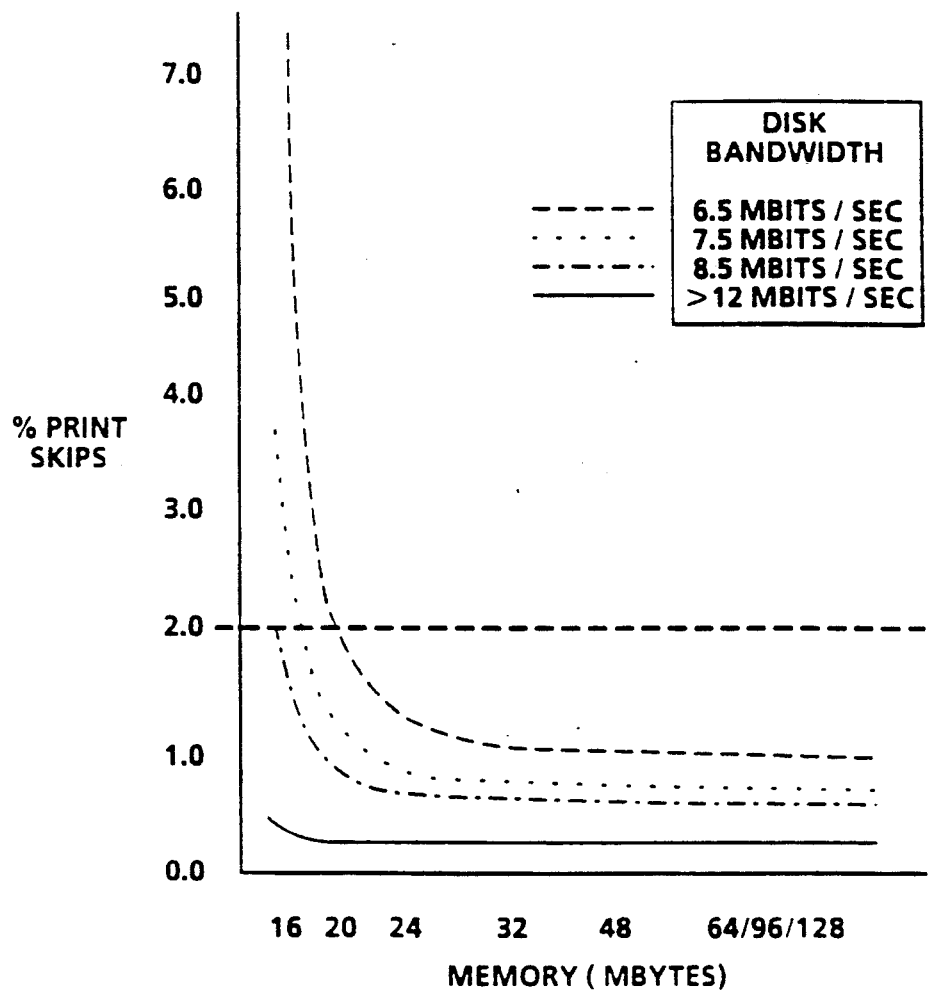
FIG. 9 is a graph illustrating the percentage of print skips per megabyte of memory for various disk bandwidths.

From FIG. 9 it can be seen that with disk bandwidth of 6.5 megabits/second and with any amount of memory greater than 24 mbytes only marginal improvements (<1%) in percentage of print pitch skips occur.

Figure 10:
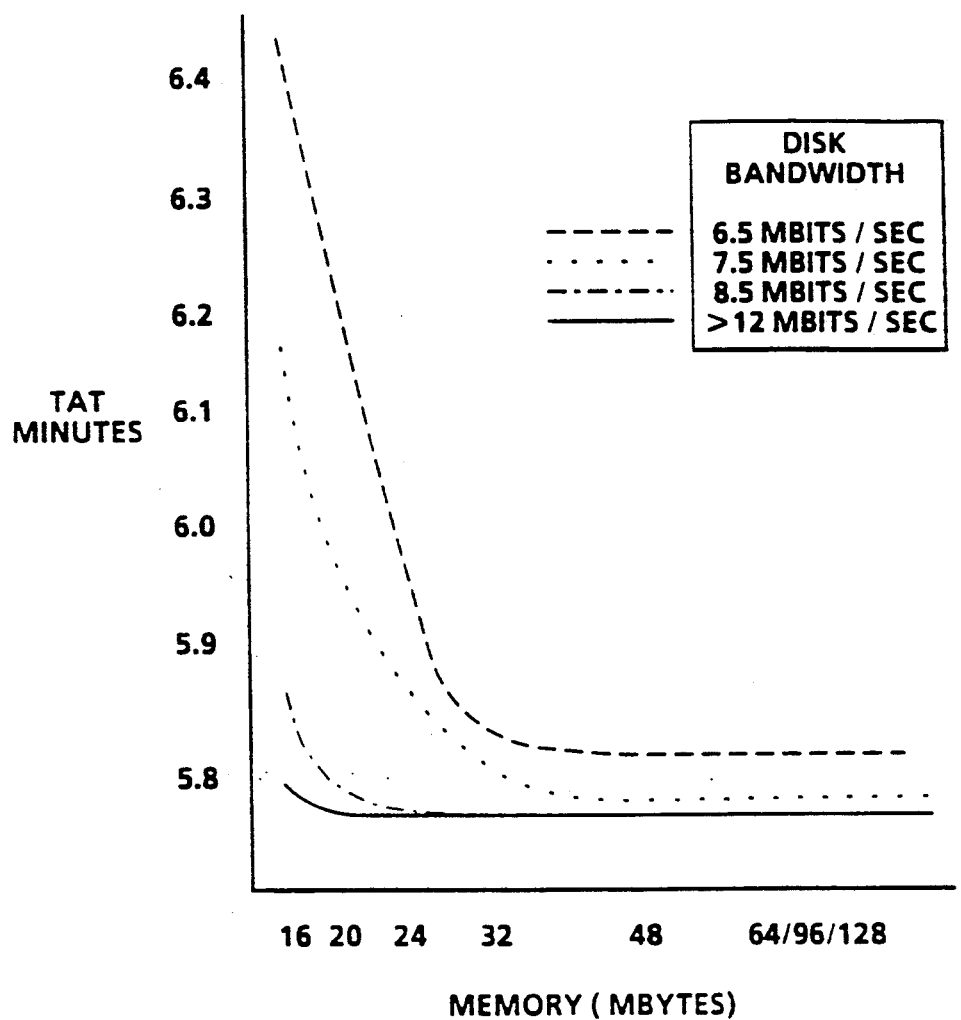
FIG. 10 is a graphical illustration showing the turn around time at various megabytes of memory for various disk bandwidths.

From FIG. 10 it can be seen that with disk bandwidth of 12 megabits/second and with any amount of memory greater than 16 mbytes only marginal improvements (<1%) in TAT result.

In FIGS. 9 and 10 for disk bandwidth >12 mbits/sec and memory size >24 Mbytes, the bottommost curves form a baseline which represents the limit of the hardware relative to system performance. The baseline can be further reduced by improving the long-term scheduling algorithm, i.e. making more efficient use of the system resources.

A preliminary study used a Long-Term Scheduling (LTS) algorithm that did set-by-set scheduling. It was noted that as the last few pages of a set were printing the disk was idle.

To make more efficient use of the disk, the set-by-set algorithm was enhanced for the current study to include the scheduling of consecutive sets. This means that for a job with 5 sets, the first set is stream printed (defined below), then a schedule of memory and disk bandwidth use is built for sets 2 and 3, after set 2 is printed a schedule is built for sets 3 and 4, and so forth. The schedule for sets 3 and 4 is derived taking into account the pages of set 3 that have already been brought into memory by the previous schedule. The revised algorithm yielded a 3.66% decrease in TAT and a 17.09% decrease in pitch skips per job.

Figure 11:
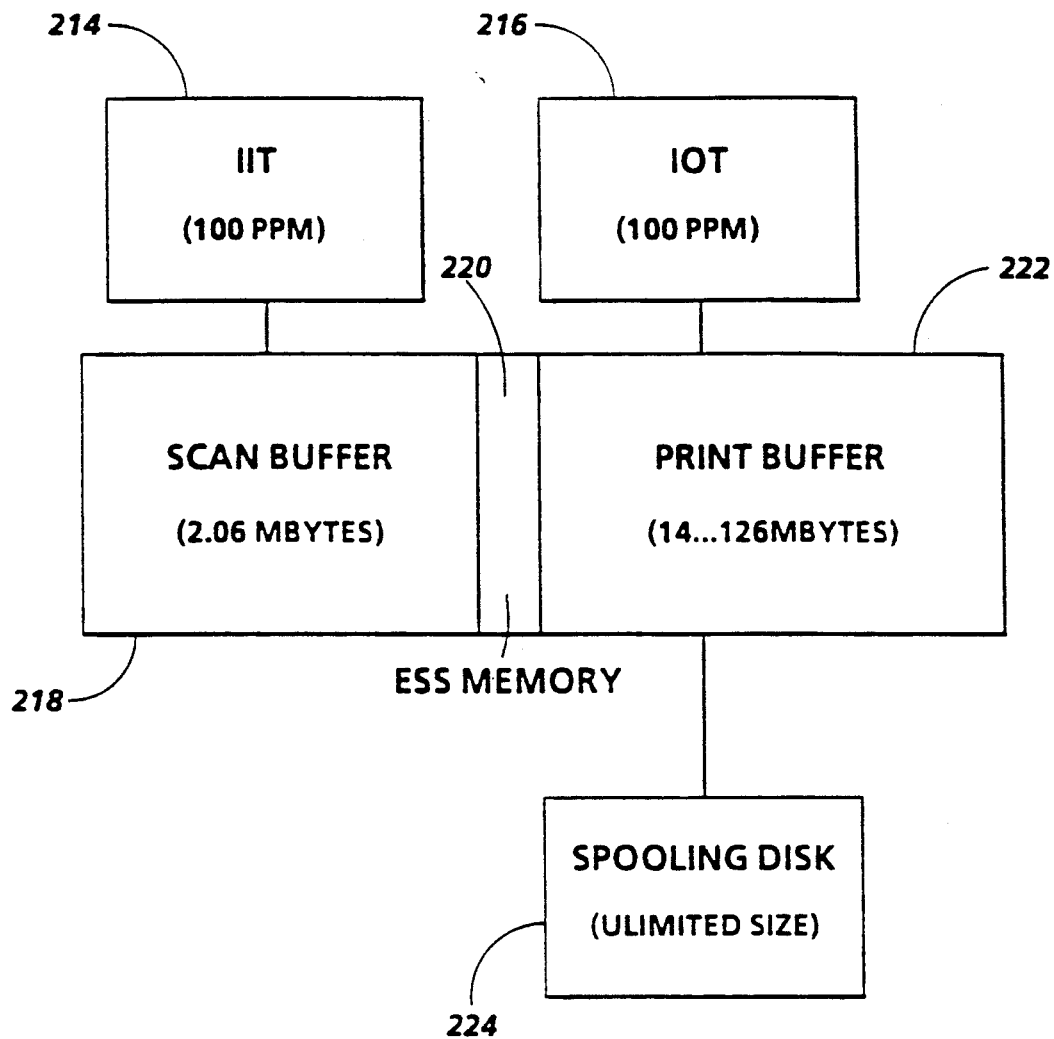
FIG. 11 is a block diagram hardware configuration used to model the present invention.

FIG. 11 is a block diagram of the target hardware configuration for a disk bandwidth/memory trade-off model. The model is a generic electronic reprographic machine consisting of four primary hardware sub-systems: Image Input Terminal (IIT) 214, the scan buffer 218 of ESS, memory 220, the print buffer 222 of ESS memory 220, Spooling Disk 224, and the Image Output Terminal (IOT) 216.

The functions and salient parameters of each of these components are discussed below.

Image Input Terminal (IIT): The IIT digitizes the image from the original document into a bitmap for subsequent processing by the ESS.

Electronic Sub System (ESS): The ESS consists of the control electronics and control system software which prepare and manage the image data flow between the data source (IIT/network interface) and the data sink (IOT) in an ER and EP system.

The ESS also includes the main memory of an ER system for documents currently being scanned or printed. In the model, ESS memory is dynamically divided into two parts: a scan buffer and a print buffer. For comparative purposes the model was run varying the ESS memory size from 16 to 128 megabytes. If a document is being scanned then a dedicated scan buffer of approximately 2 Mbytes is allocated to handle the "worst case" image. The remaining ESS memory is used as the print buffer.

Spooling Disk: The Spooling disk provides data storage for images and bit maps that have been scanned and compressed.

In the model there is no limit on the size of the Spooling disk. For the study the disk bandwidth between the ESS memory and Spooling disk was varied from 6.5 to 15 megabits per second.

Image Output Terminal (IOT): The IOT performs the function of printing. An IOT does not constitute a self-sufficient electronic printer. It accepts as input a video bit stream which has been prepared by the ESS.

The model works under the assumption that if the next image to be printed is in the print buffer then it feeds a piece of paper or else it skips one or more pitches until the image is in the buffer.

Figure 12:
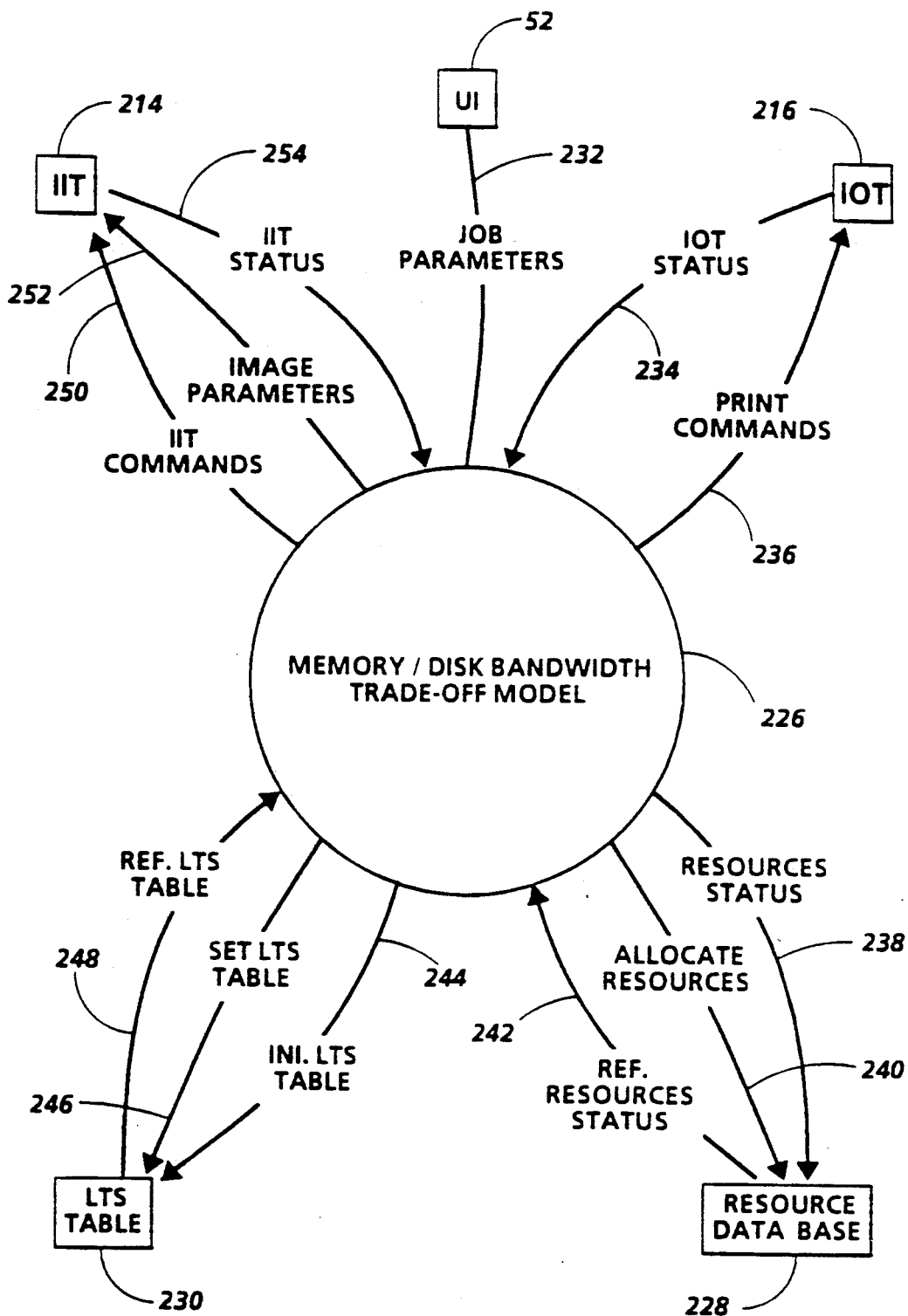
FIG. 12 is a flow diagram showing the memory/disk bandwidth trade-off means of the present invention interfaced with various components of the invention.

The Memory/Disk Bandwidth Trade-off Model 226, shown in FIG. 12, is an abstraction of the scan/mark portion of the system that was modelled. With reference to FIG. 12, UI 52 is capable of sending job parameter information 232 to the Memory/Disk Bandwidth Trade-off Model 226. IIT 214 is capable of sending IIT status information 254 and image parameter information 252 to model 226 while receiving an IIT command signal 250 from model 226. LTS table 230 is capable of sending information via line 248 which references the LTS table to Trade-off Model 226. Trade-off Model 226 has the capability of sending information via line 246 which sets the LTS table and information via line 244 which initializes the LTS table. Resource data base has the capability of sending information via line 242 which gives a reference resource status to the Trade-off Model 226. Trade-off Model 226 has the capability of sending allocation resource information 240 and resource status information 238 to the resource data base 228. IOT 216 has the capability of sending an IOT status signal 234 to the Trade-off Model 226 while receiving a print command signal 236 from the Trade-off Model 226.

The four primary modules in the model are: the System Manager, the Scan Manager, the Print Manager and the Resource Manager. These modules work together to set up the Long Term Scheduler (LTS) table, monitor system resources and control IIT/IOT activities for jobs submitted to the system via the user interface (UI). Each module is an independent process within the system and each module may include some process interfaces and synchronization mechanisms.

The LTS is an important internal data structure that is built and carried out by the Resource Manager. It contains a schedule of future print activities for each scheduled image of a set, including memory utilization and disk use activities.

Structurally, the model is divided into two parts, a set of SLAM network statements and a set of Fortran subroutines. The SLAM network part (Appendix C) is used to describe the entire process of the ER system from submitting a job to the system to unloading the finished job from the output area. The FORTRAN subroutines are used to describe the details of those events which deal with system resources. There are ten important events in the model: PICK_ORIGINAL, SCAN_PAGE, END_S_PAGE, IMAGE_JOB, IMAGE_SET, IMAGE_PAGE, MARK_PAGE, END MARK_PAGE, RESOURCE_MAN, and DISK_MAN. The first three events (Appendix D) are used to control the scan activities and the interface between the IIT and system resources. The next five events (Appendix E) are used to control the print activities and the interface between the IOT and system resources. The last two events (Appendix F and G) are used to maintain ESS memory and control disk read/write activities.

Figure 13:
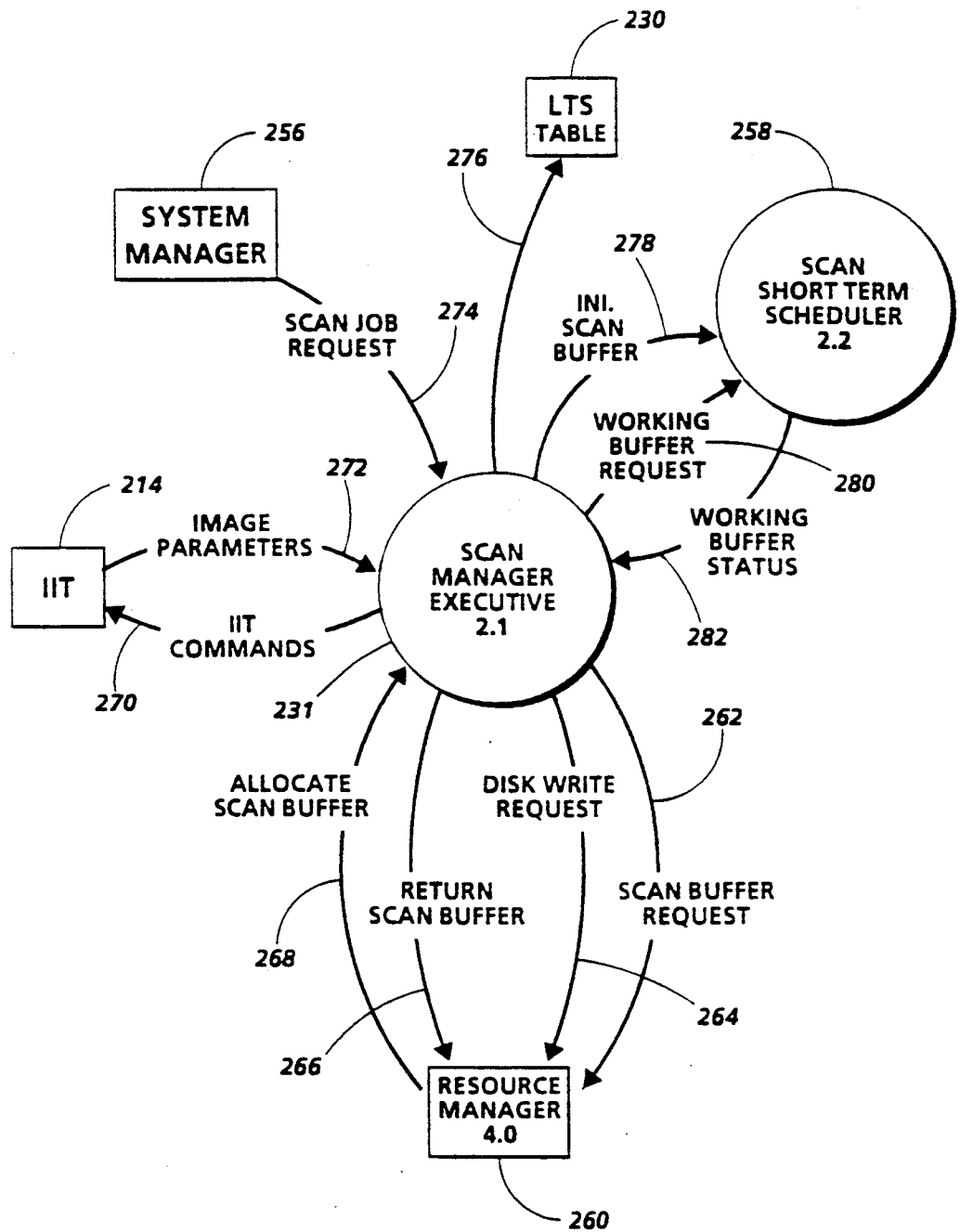
FIG. 13 is a flow diagram showing the scan manager of the present invention interfaced with various components of the present invention.

The System Manager 256, shown in FIG. 13, obtains job parameters from the UI, monitors the status of both the IIT and the IOT and maintains the Resources data base.

The System Manager monitors IIT/IOT status to determine whether the current job should be stream printed, job printed or hybrid printed. Knowing which state the system is in is important because there are three different methods for scheduling the pages of the first set:

1. Stream printing mode: Stream printing occurs when a job comes to the system and the IIT and IOT are idle. The job starts to print after scanning of the originals has begun.

No long term scheduling is done because the number of originals is not known in advance.

2. Job printing mode: Job printing occurs when all the originals of a job have already been saved to disk before the IOT is available.

The entire first set is pre-scheduled.

3. Hybrid printing mode: Hybrid printing occurs when less than 100% of the originals have been saved to disk before the IOT is available. The originals that have been scanned are job printed and therefore pre-scheduled. The originals that are to be scanned are stream printed, hence there is no pre-scheduling.

The Resources data base contains status information regarding: (1) whether the scanner, photoreceptor or RDH are busy or idle, (2) the amount of ESS memory in use, (3) whether the scan buffer is allocated, and (4) the status of the spooling disk.

The Scan manager 231 (FIG. 13) is responsible for handling scan job requests and for maintaining a dynamically allocated scan buffer.

Scan manager 231 is capable of sending an IIT command signal 270 to IIT 214 and IIT 214 is capable of sending an image parameter signal 272 to the scan manager 231. System manager 256 has the capability of sending a scan job request signal 274 to the scan manager 231 and manager 231 has the further capability of sending an initializing LTS table for stream printing signal to LTS table 230. Scan manager 231 has the capability of sending an initializing scan buffer signal 278 and a working buffer request signal 280 to scan short term scheduler 258 while scheduler 258 has the capability of sending a working buffer status signal 282 to the scan manager. Scan manager 231 has the capability of sending a scan buffer request signal 262, a disk write request signal 264 and a return scan buffer signal 266 to resource manager 260 while resource manager 260 has the capability of sending an allocate scan buffer signal 268 to the scan manager.

When a scan job request is received, the Scan manager asks the Scan Short Term Scheduler to reserve enough space to hold an image compressed at 2:1 (assuming the worst case compression ratio is 2:1) as the working buffer for the next original to be scanned. If insufficient memory is available to allocate a scan buffer then scan skip(s) will occur. Otherwise, one scan pitch later, the compressed image will be waiting in the working buffer for transfer to the disk.

If a job is in Stream Printing mode, the Scan Manager will copy the image parameters and other information for this original to the LTS Table.

The Print Manager 257 (FIG. 14) is an interface between the IOT and the Resource Manager. When a print job request is received from the System Manager, the Print Manager will initialize the LTS table for jobs in job printing mode or hybrid printing mode.

Figure 14:
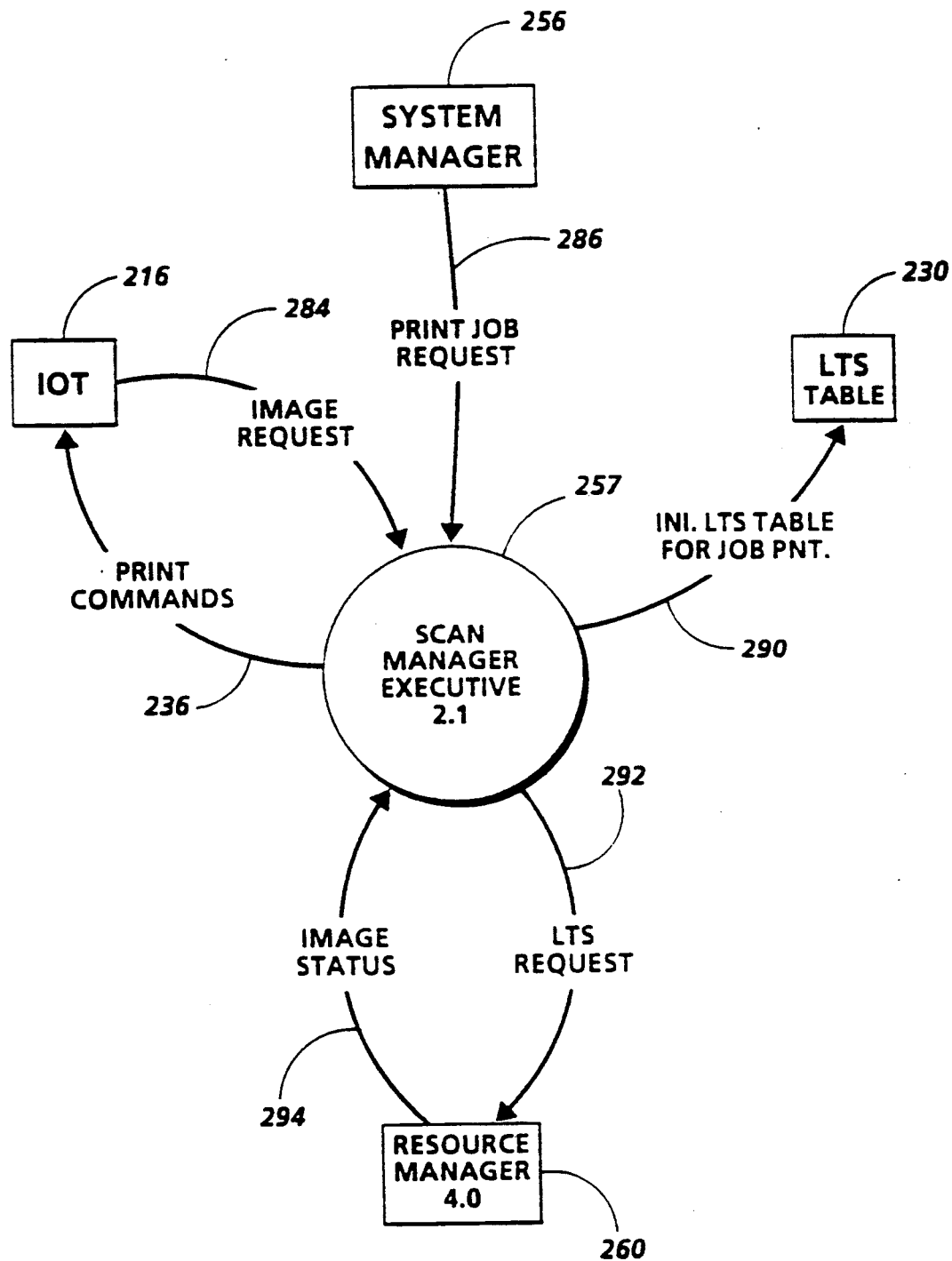
FIG. 14 is a flow diagram showing the print manager of the present invention interfaced with a number of other components of the present invention.

With reference to FIG. 14, system manager 256 has the capability of sending a print job request signal 286 to the print manager 257. The print manager has the capability of sending an initializing LTS table for job printing signal 290 to LTS table 230. The print manager 257 has the further capability of sending an LTS request signal 292 to resource manager 260 and a print commands signal 236 to the IOT 216. IOT 216 has the capability of sending image request signal 284 to the print manager and resource manager 260 has the capability of sending an image status signal 294 to the print manager.

Prior to printing each set, the Print Manager will call the appropriate print scheduler under the Resource Manager to schedule the print activities for this print set.

The Print Manager also controls the timing of IOT marking, IOT-related activities based on a print pitch-by-print pitch basis and purging of images from ESS memory and the spooling disk if this is the last page of a job.

Figure 15:
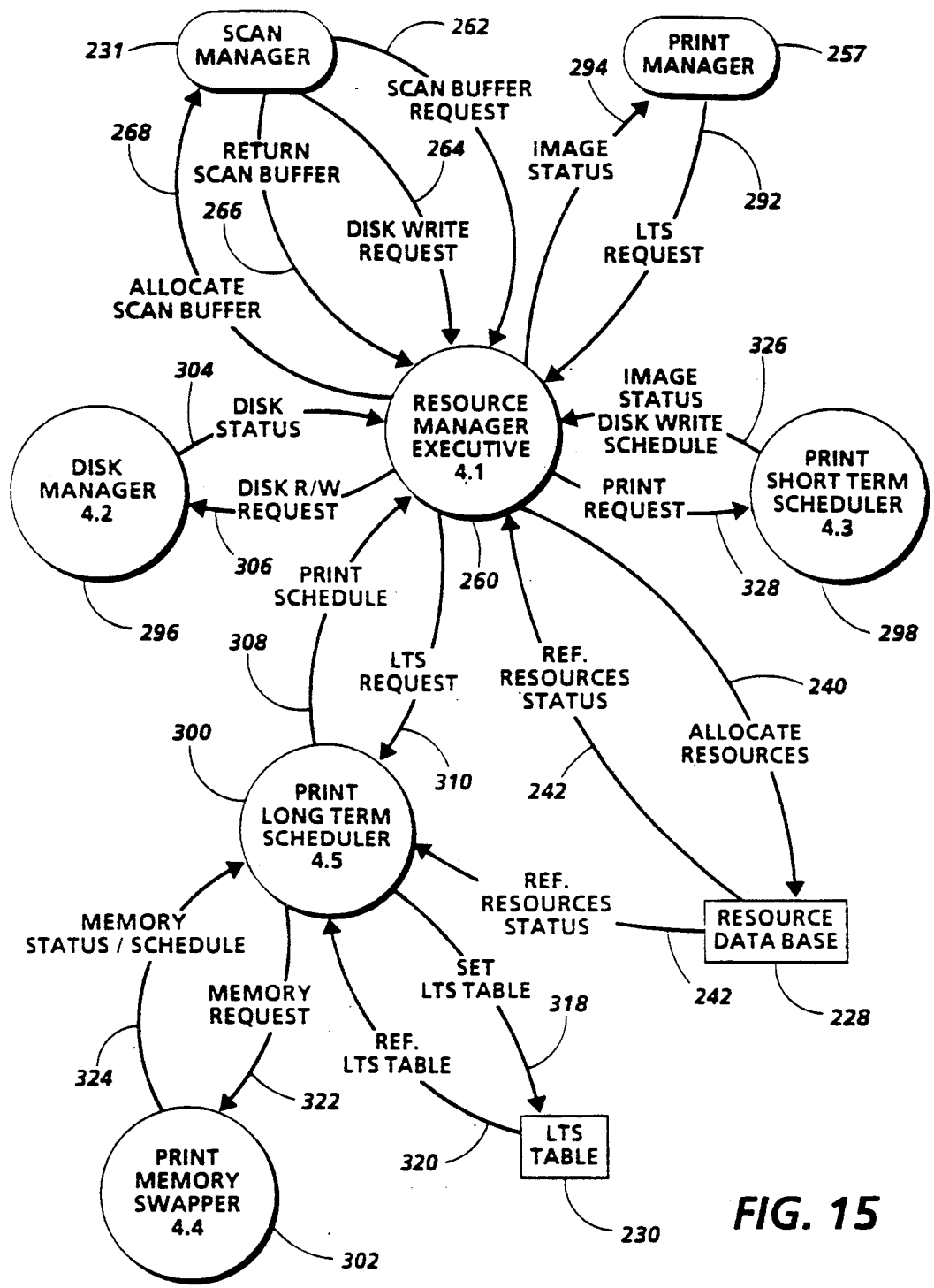
FIG. 15 is a flow diagram of the resource manager of the present invention interfaced with various other components of the present invention including the print long term scheduler.

The Resource Manager (RM) 260 (FIG. 15) acts as an interface between system resources and its clients. The clients of the RM are the Scan Manager and the Print Manager. FIG. 15 demonstrates the interactions between the scan manager, print manager and resource manager, which have previously been discussed.

FIG. 15 further demonstrates that the resource manager 260 has the capability of sending an image status signal 294 to the print manager 257, and the print manager 257 has the capability of sending a LTS request signal 292 to the resource manager 260. The resource manager 260 has the ability to send a print request signal 328 to the print short term scheduler 298 and the print short term scheduler 298 has the capability of sending an image status disk write schedule signal 326 to the resource manager 260. The resource manager 260 has the capability of sending allocate resources signal 240 to resource data base 228 and resource data base 228 has the capability of sending the reference resources data signal 242 to the resource manager. The resource data base has the further capability of sending a reference resources status signal 242 to the print long term scheduler 300 and the print long term scheduler 300 has the capability of sending a print schedule 308 signal to the resource manager 260. The resource manager 260 has the capability of sending an LTS request signal 310 to the print long term scheduler 300. Print long term scheduler 300 has the capability of sending a set LTS table signal 318 to LTS table 230 and LTS table 230 has the capability of sending a reference LTS table 320 to the print long term scheduler 300. Print memory swapper 302 has the capability of sending a memory status/schedule signal 324 to the print long term scheduler 300 and print long term scheduler 300 has the capability of sending a memory request signal 322 to the print memory swapper 302. The resource manager 260 has the further capability of sending a disk R/W request signal 306 to disk manager 296, and disk manager 296 has the capability of sending a disk status signal 304 to the resource manager 260.

The Print Long Term Scheduler (LTS) routine sets up a schedule for the next set to be printed by reserving the required disk bandwidth and ESS memory for each image file in advance according to the current memory status, disk bandwidth utilization, and an initialized LTS Table. Eventually, the available memory may be reserved by the front portion of a job, leaving no space for the rear portion of the job. At that moment, the Print LTS will call the Print Memory Swapper routine to delete some image file(s) from the ESS memory in order to make room for the next image file to be brought into memory. In addition, the Print LTS allocates adequate disk bandwidth to the scan client to maintain scan/print concurrency.

The Print Short Term Scheduler (STS) executes the schedule of activities specified in the LTS Table.

The Disk Manager handles disk read and write requests made by the Print STS and the Print LTS.

D. Long-Term Scheduler

One of the primary objectives in designing a working model was to investigate the relative performance of different long-term scheduling algorithms. The primary issues related to developing an efficient LTS algorithm are:

- How many pages should be scheduled in advance? Scheduling too few pages in advance, e.g. page-by-page scheduling wastes disk bandwidth. Although scheduling all the pages of all sets of a job will result in an optimal schedule there are two major drawbacks: 1) this might prove impractical in a real-time mode and 2) may lose a certain degree of scan/print concurrency.

When a job is printing and memory reaches capacity which page(s) should be deleted? Of the memory management algorithms tested the best method was swap out the Most Recent Printed and Saved Image File First (RPSF).

The RPSF scheme works in the following way (see Appendix I and J): Before starting to print a new set of a job, the LTS will schedule the required disk bandwidth and ESS memory for each image file based on the memory status, bandwidth utilization, and the size of each image file. If there is not enough memory left for the next image file to be scheduled, then some previously loaded and saved image file(s) will be deleted from the printing buffer after they have been printed. The order in which the images are deleted is based on how long ago its data was printed with preference being given to those not recently printed.

a) Principle Long Term Scheduling Algorithms

In an electronic reprographic (ER) and electronic printing (EP) system the allocation of resources such as memory and disk bandwidth is done by the resource manager. The algorithm used to manage and allocate these limited resources in an ER/EP system has a significant impact on system performance in terms of turnaround time (TAT) and percentage of pitch skips per job.

To better understand the problem of resource management consider the following cases:

1. If the number of originals per job (OPJ) is relatively small and hence all the originals of a job can reside in memory at one time then disk speed and resource allocation are unimportant. This is because if all the pages are in memory then there is no need to transfer individual pages or parts of pages, called segments, on and off the disk.

2. If the number of prints per original (PPO) is equal to 1 then the size of memory and resource allocation are relatively unimportant. The reason for this is in a system which prints pages at the same speed that it scans originals then as each page is printed it can be discarded thus freeing up memory. Naturally, memory must be able to hold some number of pages at one time where this number is dependent on the imaging system and the length of its paper paths.

3. If PPO is greater than 1 and the segments from all of the pages cannot reside in memory at one time then resource allocation, i.e., the size of memory, and the speed of the disk each play an important role in the performance of the system.

The following describes the evolution of scheduling algorithms used in the present invention:

Offset Method—The idea of the offset algorithm is to allow for a small period of time (offset time) between the image request time and the image print time for a specified image. The offset time is expressed in some number of print pitches (see FIG. 16). The idea of the offset scheme is to allow for a lag time between the request time and the print time for a page. The offset time is expressed in some number of print pitches, in this case 2.

Single Set advanced scheduling method—This algorithm (which corresponds to the Long Term Scheduler Algorithm: Appendix A) takes advantage of the wasted disk bandwidth created by the offset method. This is accomplished by scheduling the required disk bandwidth necessary to retrieve each image in a print set prior to the printing of the set (see FIG. 17).

Consecutive set scheduling method—This algorithm (Appendix H) attempts to reduce the number of skips (between sets) caused by the single set advanced scheduling method. This technique (FIG. 18) schedules memory usage and disk bandwidth for sets n and n+1 and submits the schedule to the resource manager for execution, after set n−1 has been printed. The schedule for set n takes into account the images which still reside in memory at the print completion of set n−1. This technique allows any unused bandwidth during the printing of set n to be used for an image retrieval of set n+1.

Figure 16:
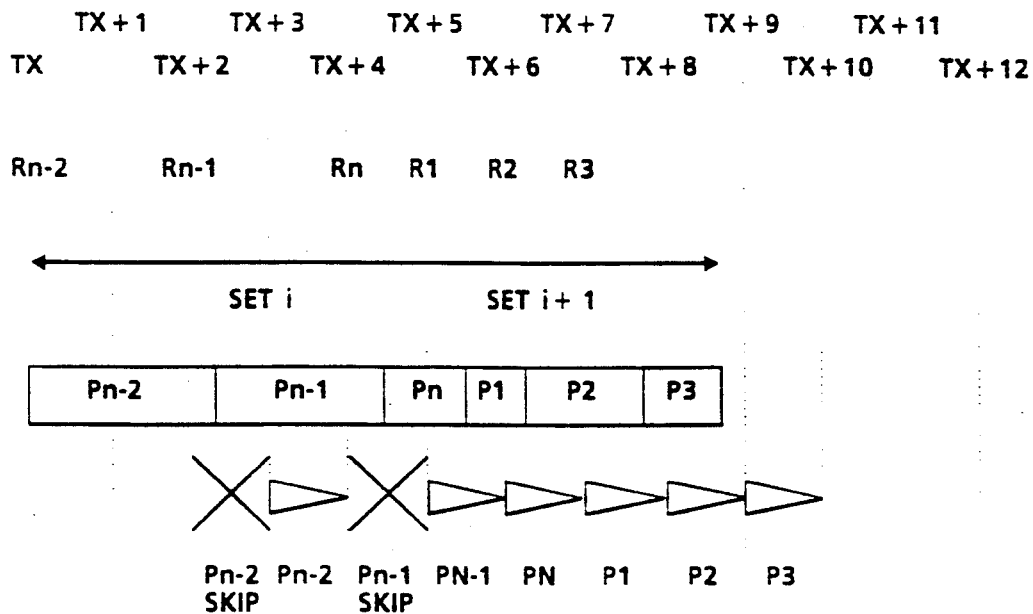
FIG. 16 is a graphical illustration of the offset method of the present invention.

FIG. 16 illustrates the offset method and shows the partial requests, page transfers and printing of sets i and i+1 with n originals. In addition, in FIG. 16 T is the i/h pitch time, Ri is the request for page i and Pi is page i. The triangular symbol ▷ represents printing of the designated page, the rectangular symbol ☐ represents the disk read time for the page and the crossed symbol X represents the print skip due to disk bandwidth limitation. The elongated arrow ← → means that the disk is busy for the print client. The offset value used is 2 pitches. In this instance there is a requirement of 2 pitches between the request for the page and the printing of that page. For offset equal to 2 this results in a 3 pitch difference between the request and the completion of printing of that page.

A requirement of the offset algorithm is that a request for a page can only occur on a pitch boundary. This requirement can result in wasted bandwidth. For example, for offset=2, there is a 2 pitch difference between request and print time. If $\frac{3}{4}$ of a pitch of bandwidth is required to bring in a page there will be $\frac{1}{4}$ pitch of wasted bandwidth since the next page request will not occur until the next pitch boundary.

For example in FIG. 16, Page $P_n-2$ is requested ($R_n-2$) at time $T_x$, but not printed until time $T_x+3$ due to the time it takes to read page $P_n-2$ which extends into the period between $T_x+2$ and $T_x+3$. A skipped pitch results for page $P_n-2$.

To alleviate this problem the Single Set LTS Algorithm schedules system resources for a certain number of pages ahead since the printing requirements, number of originals, number of sets and complexity of images, for each job in an ER system are known before a job starts printing.

Assuming a job had m sets, in job printing mode the single set implementation of the Long Term Scheduling (LTS) algorithm scheduled sets 1..m on a set-by-set basis. In stream printing mode, sets 2..m are scheduled on a set-by-set basis. For example, in stream printing mode a memory/disk bandwidth schedule was built for set 2 and submitted to the resource manager (RM) for execution. Then, a schedule for set 3 was built and executed by the RM, a schedule for set 4 was built by the LTS and executed by the RM and so forth. The result of scheduling sets using this method is that there may be some unused bandwidth between consecutive sets thus causing unnecessary print pitch skips; this is depicted in FIG. 17.

Figure 17:
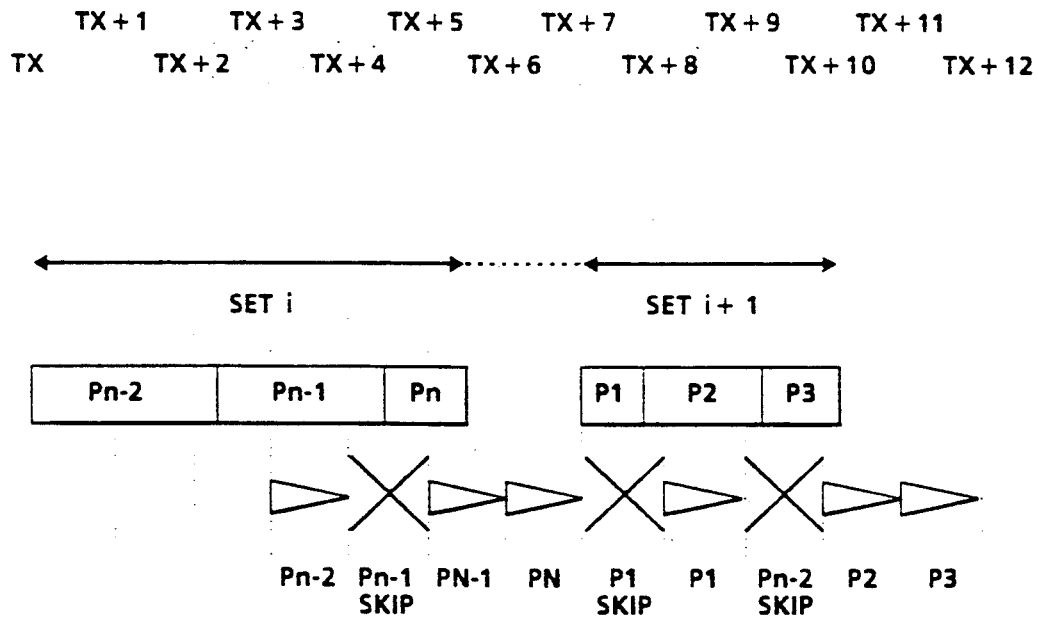
FIG. 17 is a graphical illustration of the single set advance scheduling method of the present invention.

Assuming a print job has n originals and m sets, FIG. 17 shows the bandwidth utilization of bringing in the last three pages of set i and the first three pages of set i+1. The print skip for page $P_{n-1}$ was unavoidable because of the length of time it took to transfer page $P_{n-1}$ to memory. But, note the unused bandwidth during $T_{x+5}$ and $T_{x+6}$ caused by not scheduling pages of set i+1 until $T_{x+7}$ was available if consecutive set scheduling was used as described below.

Figure 18:
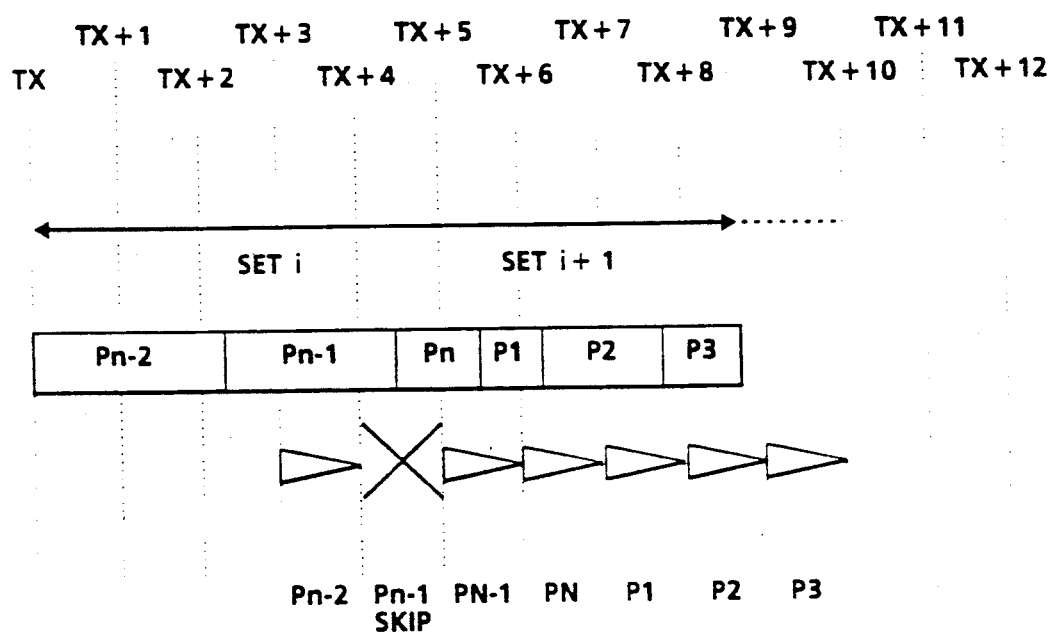
FIG. 18 is a graphical illustration of the consecutive set scheduling method of the present invention.

The Single Set LTS algorithm was modified to perform scheduling of consecutive sets (FIG. 18). The upgraded LTS schedules memory and disk bandwidth for sets 2 and 3 and submits the schedule to the RM for execution. After set 2 has completed printing the LTS schedules sets 3 and 4 taking into consideration those pages of set 3 that have been brought into memory, and so forth. This technique enables the bandwidth of $T_{x+5}$ and $T_{x+6}$ to be used and eliminates the print skips caused by $P_1$ and $P_2$ of set i+1. The effect of consecutive set scheduling is shown in FIG. 18.

b) Analysis

The system model used to analyze the three scheduling algorithms was built using a combination of the SLAM II simulation language and FORTRAN. The model included concurrent scan/print functions, an automatic document handler (ADH) capacity of 100 originals for simplex → simplex printing, and a spooling disk large enough to hold all jobs currently in the system. The average compression ratio for scanned images was 10:1 with a worst case compression ratio of 2:1.

The results below are based on running 250 jobs at 360K average monthly copy volume, which is approximately 1 weeks worth of jobs. Arrival time of jobs, compression ratio of pages, job type, number of originals, number of copies and all other job demographic information were generated using Monte Carlo techniques.

The model consisted of a 100 page per minute (ppm) scanner and a 100 ppm printer. All jobs consisted of A4 paper running in simplex to simplex mode. The average number of originals per job was 10 and the average number of copies per job was 40. The average runlength per job was 166 impressions.

The results indicated that single set scheduling was superior to the Offset algorithm.

The consecutive set scheduling algorithm was proposed and implemented as an improvement over the single set scheduling algorithm. FIG. 19 is a table which illustrates the improvement in turn around time and pitch skips (percentage improvement) when the consecutive set scheduling algorithm was used compared to the single set scheduling algorithm.

E. Memory Management

The following discussion concerns the swapping of images from memory when the amount of memory is insufficient to contain the compressed data for each of the images in a print job. The problem of image replacement occurs when an image, already residing on the spool disk, is required to be in memory, and there is not enough available memory to hold the compressed bit map form of the image. The resource manager must decide from the pages currently residing in memory, which would be best to remove from memory in order to retrieve the next needed image. Image swapping techniques may be based on swapping entire images or partial images.

It has been shown through simulation that, given an electronic reprographic system with a fixed set of resources, namely memory and disk bandwidth, system performance can be affected through the implementation of different memory management swapping algorithms. The algorithms can apply page swapping techniques (algorithms 1-3 below) or segment (partial image) swapping techniques (algorithms 4-5 below). Those algorithms developed and analyzed are described in detail below:

1. Most Recently Used Image Swapping Algorithm (Appendix I): The Most Recently Used Image Swapping algorithm (corresponds to RPSF) chooses to swap out the image most recently used (printed and saved) from the set of images residing in memory at the time the next image is required in memory.

2. Largest Recently Used Image Swapping Algorithm: The Largest Recently Used Image Swapping algorithm chooses to swap out the largest image provided that is to have been printed and saved from the set of images residing in memory at the time the next image is required in memory.

3. Smallest Recently Used Image Swapping Algorithm: The Smallest Recently Used Image Swapping algorithm chooses to swap out the smallest image provided that it has been printed and saved from the set of images residing in memory at the time the next image is required in memory.

4. Most Recently Used Segment Swapping algorithm (Appendix J): The Most Recently Used Segment Swapping algorithm chooses to swap partial or full image(s) depending on the amount of memory required in an ordering of images from the most recently printed images which still reside in memory to the least recently printed image which still resides in memory. In this algorithm each image is defined to consist of a group of segments. The size of a segment is, in turn, defined to be constant and whose actual size is dependent on the particular spool disk's characteristics. When an image needs to be swapped into memory the scheduler computes the exact number of segments of memory which must be swapped out to allow for the retrieval of the new image into memory. The scheduler then checks all the images which can be removed from memory at the time desired and swaps out only as many segments from the image or images most recently printed. This algorithm is the optimal algorithm under the stated assumptions because it generates the least amount of swapped segments, and since segments are of equal size by definition, this algorithm reduces the amount of disk reading to a minimum.

Figure 26:
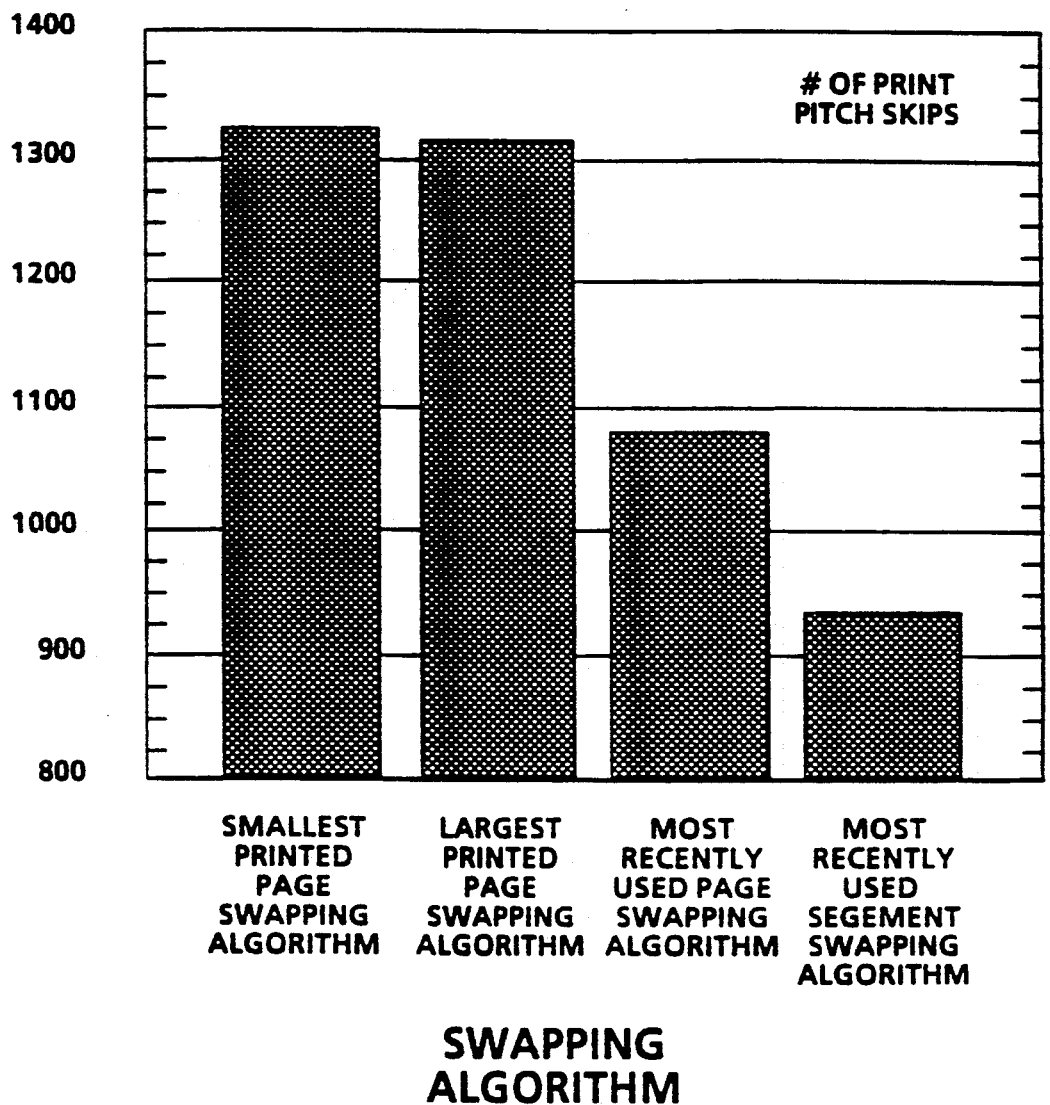
FIG. 26 is a bar graph comparing various swapping algorithms of the present invention.

Experimentation has shown that the Most Recently Used Segment Swapping Algorithm is the preferred technique. The Most Recently Used Segment Swapping Algorithm is compared to other algorithms (a print pitch skip comparison) in the bar graphs of FIG. 26.

5. The Sequential Limited Segment Swapping algorithm (Appendix K): This algorithm is also based on the major assumption that partial images can be swapped in and out of memory. Here when the scheduler needs to swap a certain number of segments from memory then in a most recently used ordering of images, some limited number of segments are removed from those images currently available in memory which can be swapped out. The number of segments which are removed is based on the number of segments which can be retrieved from the disk in one pitch time frame, hence the name the Sequential Limited Segment Swapping algorithm. While this algorithm cannot be better than the Most Recently Used Segment Swapping algorithm, it results in forcing the disk to spread out the time the disk is busy across the entire print set. It suffers slightly from incurring more disk overhead in terms of the number of seeks and rotational latency times which must transpire.

FIG. 25 is a table comparing the percentage of pitch skips at various memory megabit capacities for the Sequential Limited Segment Swapping Algorithm and the Most Recently Used Page Swapping Algorithm.

These image and partial image swapping algorithms when implemented in the course of scheduling an image print set or sets of a particular job, can increase the performance of an electronic reprographic system and an electronic printing system. This is done by selectively choosing which partial image(s) or full image(s) to swap from memory when the amount of memory is insufficient to contain the compressed data for each of the images in the print portion of a job. Consequently, this increase in performance will increase the performance/cost ratio for electronic based printers and production systems.

The study of image replacement algorithms took place within the confines of a discrete event simulation model developed to assess the performance of a simple electronic sub-system architecture configuration. Within this framework the various algorithms were introduced and analyzed and later the results were compared.

The system model used consisted of an Image Input Terminal, an electronic subsystem, a spooling disk, and an Image Output terminal. Other sub-systems such as the user interface and the network interface card were not included in the model as the spooling disk and memory on the scan/print channel will not be affected by these subsystems. The system model simulated the concurrent scan/print function for randomly arriving jobs which were placed in the automatic document handler for scanning by an operator. It was assumed that the spool disk would have enough space to hold the images from all of the jobs in the system at any given time. A mean compression ratio of 10:1 and a worst case compression ratio of 2:1 were also assumed.

The results calculated to assess the performance of the system for each of the swapping algorithms were based on running 250 jobs at an average monthly copy volume of approximately 350K. Arrival time of the jobs, compression ratio of pages, number of originals, number of copies, and all other job demographic data were generated using Monte Carlo techniques.

Both average turn around time (TAT) and the percentage of print pitch skips are used as criteria to measure the performance of the resource management algorithms. Average TAT is defined as the average duration of time it takes to complete the scanning/printing of a set of jobs including the time it takes to program, load, scan, print, and unload the jobs from the system in addition to any waiting time incurred because the system or operator was busy. Turn around time for a single job is specifically measured as the time duration from when the particular job arrived to the operator for work until the job was removed from the system by the operator.

The second performance measurement is the percentage of print pitch skips generated by the system. A single print pitch skip occurs during the printing of a job when the ESS cannot provide the required print image to the IOT at the specified print time for that particular image. Each pitch skip encountered represents a period of time when the IOT engine, although in operation, is not producing any hard copy output. The percentage of print pitch skips is calculated as the total number of print pitch skips divided by the total number of impressions made plus the total number of print pitch skips.

Performance was assessed for systems having 16, 20, 24, 32, 48, and 64 Mega Bytes of memory coupled with a rigid disk whose transfer rate (not including average rotational latency nor average seek durations) is either 6.5, 7.5, 8.5, or 12 Mega bits per second. For each disk transaction an additional average overhead cost was included in the effective transfer rate to account for average rotational latency and average seek duration. This results in a combination of twenty-four distinct ER system configurations. The twenty-four configurations are modelled for each memory management algorithm. A volume of approximately 350K prints per month is represented.

FIGS. 20 and 21 are tables which compare Most Recently Used Segment Swapping Algorithm with the Most Recently Used and Saved Page Swapping Algorithm.

F. Coordinating Resource and Memory Management

Conceptually, one can think of the IOT as a consumer which requires an image file at every print pitch and the ESS as a producer which provides the required images for the IOT. If the ESS cannot provide the required image before the IOT is ready to print it, then the IOT waits, thus incurring print skips. In other words, the print skip is due to the ESS not being able to provide the required image fast enough.

The main problem is how to meet the IOT consumption rate with the limited resources in hand. In preparing a model for the present invention it was assumed that the ADH capacity was 100 originals for simplex/simplex printing, and the spooling disk capacity was large enough to hold the jobs that would come to the device. The mean compression ratio was 10:1, and the worst case compression ratio was 2:1. It was further assumed that under the limited resources environment, the ESS might not be able to provide the required images fast enough. Therefore, each job might have a certain number of print skips.

To minimize print pitch skips, the minimum required resources, and the optimal strategy to manage those limited resources was determined. The possible ranges of memory size and disk bandwidth were estimated. The six selected disk bandwidths were: 6.5, 7.5, 8.5, 12, 13, and 15 Mbits/sec. The eight memory sizes selected were: 16, 20, 24, 32, 48, 64, 96, and 128 Mbytes. The model was run for 48 different disk bandwidth/memory configurations.

Inside the model, there are two important software modules which are called by the resource manager to manipulate the limited resources. These software modules are the Long Term Scheduler (LTS) and the Short Term Scheduler (STS). The LTS is responsible for scheduling the resources during some time frame. The STS is responsible for simulating the schedule provided by the LTS.

The two major tasks performed by the LTS are; 1) minimize turn-around time while keeping the total number of print skips for each job within defined limits. This is done by scheduling the required disk bandwidth and ESS memory for a group of images in advance. In other words, after a job has been scanned into the system, the LTS can reduce the print skips by carefully planning the use of its limited resources based on the memory status, bandwidth utilization, size of each image file, and number of originals. 2) Ensure that there is enough memory left for the IIT (STS will support the necessary bandwidth for the IIT) to perform concurrent scan and print. Unfortunately, the LTS cannot foretell the future. It cannot know when the next job is going to request the IIT, nor the size of each image of the next job. The allocation of the scan buffer must be made on some ad hoc scheme; there was always reserved enough scan buffer to hold a 2:1 image file (the worst case).

The two primary tasks performed by the STS are: 1) ensure that the scheduled image file has been loaded into the ESS print buffer before printing starts for this image file. If not, then a print skip(s) is required for this page. 2) Attempt to provide concurrent scan/print by granting the next available disk bandwidth to the IIT.

1. Memory Management Algorithms

In order to minimize print skips, the LTS needs to schedule the required disk bandwidth and ESS memory for each image file in advance. If the ESS memory is large enough to hold all the image files of a job, then, print skips may only occur during the first print set of a job print job and no print skips will occur for a stream printing job. Hence, the task of the LTS is much easier. In this case the number of print skips of a job print job are only dependent on the disk bandwidth.

The low end memory size in the study was 16 Mbytes, which can hold eight 2:1 image files, or forty 10:1 image files. Eventually, the limited memory space will be occupied by the front portion of a large job, and leave no space for the rear portion of the job. At that moment, the LTS will call the swapper to delete some image file(s) from the ESS memory in order to make room for the next image file to be brought into memory.

2. General Assumptions and Review of Definitions

- Disk Bandwidth: Data transfer rate selected is the pure throughput of a logical disk. We assume the maximum seek time is 35 msec and the minimum seek time is 8 msec. We also assume that the system needs two Maximum seeks to access an image file. The six selected disk bandwidths are only used for the scan and print functions.

- Job Matrix: A modified 360K job matrix was used for this study based on the RBG 200K Matrix. Assume A4 paper and Simplex to Simplex printing for all jobs.

- Job Printing & Hybrid Printing: Printing modes that occur when the IOT is busy with a previous job as the current job arrives to the system. Job Printing mode occurs when all image files of the newly arrived job have been saved into the Spooling Disk before the IOT is available. Hybrid printing occurs when less than 100% of the originals have been saved before the IOT is available.

- Long Term Scheduler (LTS): the major module of the Resource Manager. It attempts to minimize TAT and print skips by carefully planning the use of its limited resources based in its knowledge of the system and its current job.

- Short Term Scheduler (STS): Another major module of the Resource manager. The STS carries out schedules that are set by the LTS at print time, and allocates ideal disk bandwidth to the IIT to support scan/print concurrency.

Stream Printing: A printing mode that occurs when both the IIT and IOT are idle as the current job arrives to the system.

3. Basic Assumptions

Page Sequence: Both IIT and IOT operated in a 1:N mode.

Compression Ration: 65% text pages (CR=N(15,2)) 5% pictorial pages (CR=N(4,2)) 30% mixed pages (⅔ text, ⅓ pictorial)

| Operator Times: | |
|---|---|
| Read job order and load document handler | 8.4 SEC |
| program system | 8.0 SEC |
| unload document handler | 5.0 SEC |
| unload job and complete work order Job Parameters in the Working Job Matrix: | 2.0 SEC |
| AMCV | 360k (1100 JOBS/MONTH) |
| Simulated jobs | 250 jobs run |
| mean Originals Per Job (OPJ) | 9.90 |
| Simulated OPJ | 10.30 |
| mean Prints Per Original (PPO) | 38.65 |
| Simulated PPO | 40.34 |

-continued

| | |
|---|---|
| mean volume per job | 182.60 |
| Simulated mean volume per job | 166.10 |
| Exponential Interjob Arrival Time | 265.49 SEC |
| (Other AMCV can be simulated by changing the I.A.T.) | |
| IIT Parameters | |
| printer speed | 100 PPM |
| IIT pitch time | 0.6 SEC |
| resolution | 600 SPI |
| scan width | 11" |
| long edge feed A4 paper | |
| IOT Parameters | |
| scanner speed | 100 PPM |
| IOT pitch time | 0.6 SEC |
| resolution | 600 SPI |
| scan width | 11" |
| long edge feed A4 paper | |
| Spooling Disk Parameters | |
| disk bandwidth | 6.5-15 MBITS/SEC |
| Max seek time | 35 MSEC |
| Min seek time | 8 MSEC |
| cylinder size | 96 KBYTES (or 1 segment) |
| ESS Memory | |
| memory size | 8 MBYTES-128 MBYTES |
| memory unit | 1 segment (= 96 KBYTES) |

The role of the memory management/swapping algorithms is to increase system performance of a given ESS architecture, by better utilizing the system's limited resources. The criteria used to measure the performance of the memory management/swapping algorithms include both average job turn around time and the percentage of print pitch skips. Precise definitions of these performance measures are discussed above. In addition to comparisons between the different memory management/swapping schemes, the results are also used to generate a set of tradeoff curves between the amount of memory and disk bandwidth needed to reach certain performance levels.

The basic ESS architecture modelled in this set of experiments consists of a limited pool of memory coupled with an input device, an output device, and a spool disk. All four components are managed by the resource manager, even though the input and output devices and the disk drive have their own controllers to carry out their specific functions. For example, although the resource manager does not control the scanner in terms of mechanically scanning a document, it does restrict when the scanner can begin scanning by not providing it enough memory to begin operating.

The main function of the ESS in this set of experiments was to allow the system to accept and execute scan/print jobs. The three basic steps of the scan/print function are 1) scan the set of originals into memory, 2) store each original as a compressed bitmap onto the spool disk, and 3) print the desired number of copies of the set of originals. The memory management algorithms have been developed to execute each of the three steps concurrently to allow for storing and printing of images while scanning images. Note that because the speeds of the input and output device are equivalent, printing of the first image may begin as soon as that original has been scanned into memory. For the current set of experiments the input and output devices function at a maximum rate of 100 images per minute.

Because of the limited amount of memory in the ER system, there comes a point in time when the system requires an image, not currently residing in memory but stored on the spool disk, to be in memory, and there is not enough available memory to hold the compressed bitmap form of the image. The resource manager must then decide which of the pages currently in memory would be best to remove from memory to make room for the incoming image. The goal here is to remove an image which will have little or no effect on performance.

The Most Recently Used Segment Swapping algorithm is best because it chooses to swap out the most recently used segments, which for an ER system, is equivalent to swapping out the segments not needed until furthest into the future. Consult Appendix I and J.

The results (FIG. 20-21) show that the Most Recently Used Segment Swapping Algorithm is significantly better than the previously studied swap algorithm called the Most Recently Used Page Swapping Algorithm.

The results show that the Most Recently Used Segment Swapping algorithm when compared to the Most Recently Used Page Swapping algorithm, reduces the percentage of print pitch skips per job by approximately 6% (from 12.27% to 6.30%) and reduces average turn around time by 1.8% (from 6.803 to 6.677 minutes) for an ER system containing 16 Mega Bytes of Memory and a disk whose average transfer rate is 6.5 Mega Bits per second. As the amount of ESS memory is increased, the performance difference between the Most Recently Used Segment Swapping algorithm and Most Recently Used Page Swapping algorithm is reduced. In addition, as the disk bandwidth is increased the performance difference is reduced between the Most Recently Used Segment Swapping algorithm and the Most Recently Used Page Swapping algorithm. Finally, as memory and/or disk bandwidth is increased, both average turn around time and print pitch skips are reduced for either memory management algorithm.

The results suggest that the performance of an ER system as measured in TAT and print pitch skips can be affected by the memory management techniques employed given a fixed set of resources. The capability of swapping partial images can increase performance in an ER system with limited resources.

The memory management algorithms are a small portion of the encompassing resource allocation algorithms. Specifically, the memory management algorithms are the routines which decide during special circumstances which of the pages residing in memory are to be swapped, in order to make room for an incoming image. The actual scheduling of jobs and reserving resources is done by the resource allocation algorithms.

Figure 23:
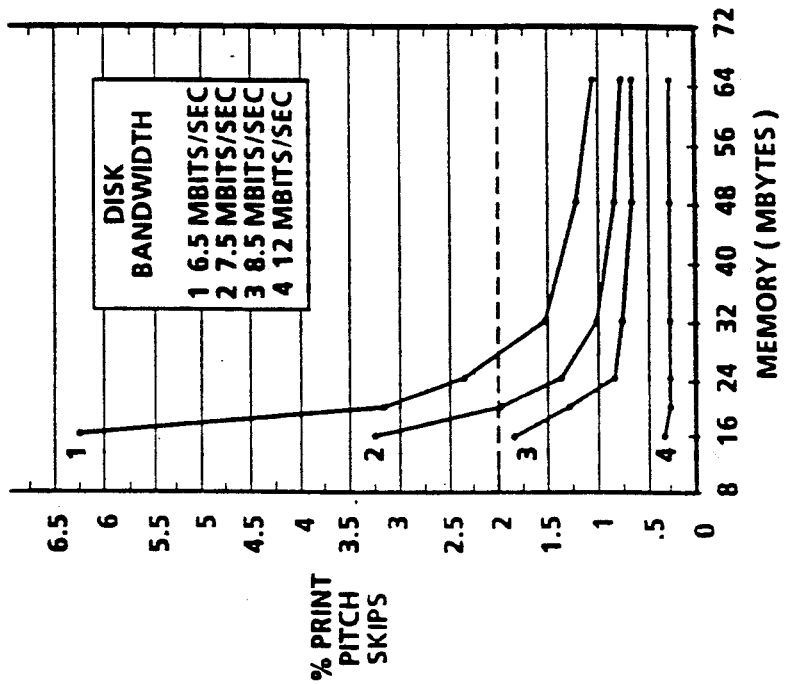
FIG. 23 is a graph comparing percentage of print pitch skips per megabytes of memory for various disk bandwidths.
Figure 22:
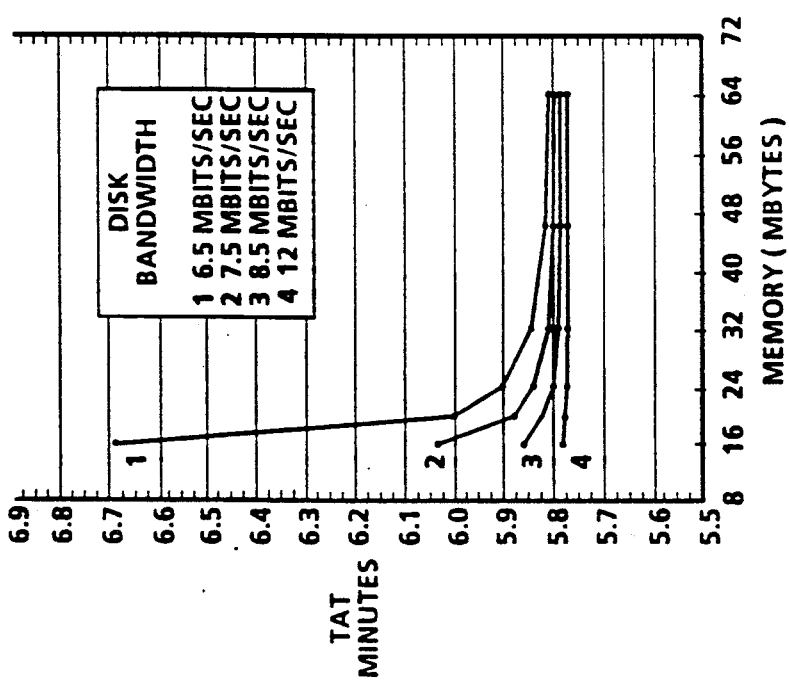
FIG. 22 is a graph comparing turn-around time in minutes per megabytes of memory for various disk band/widths.
Figure 24:
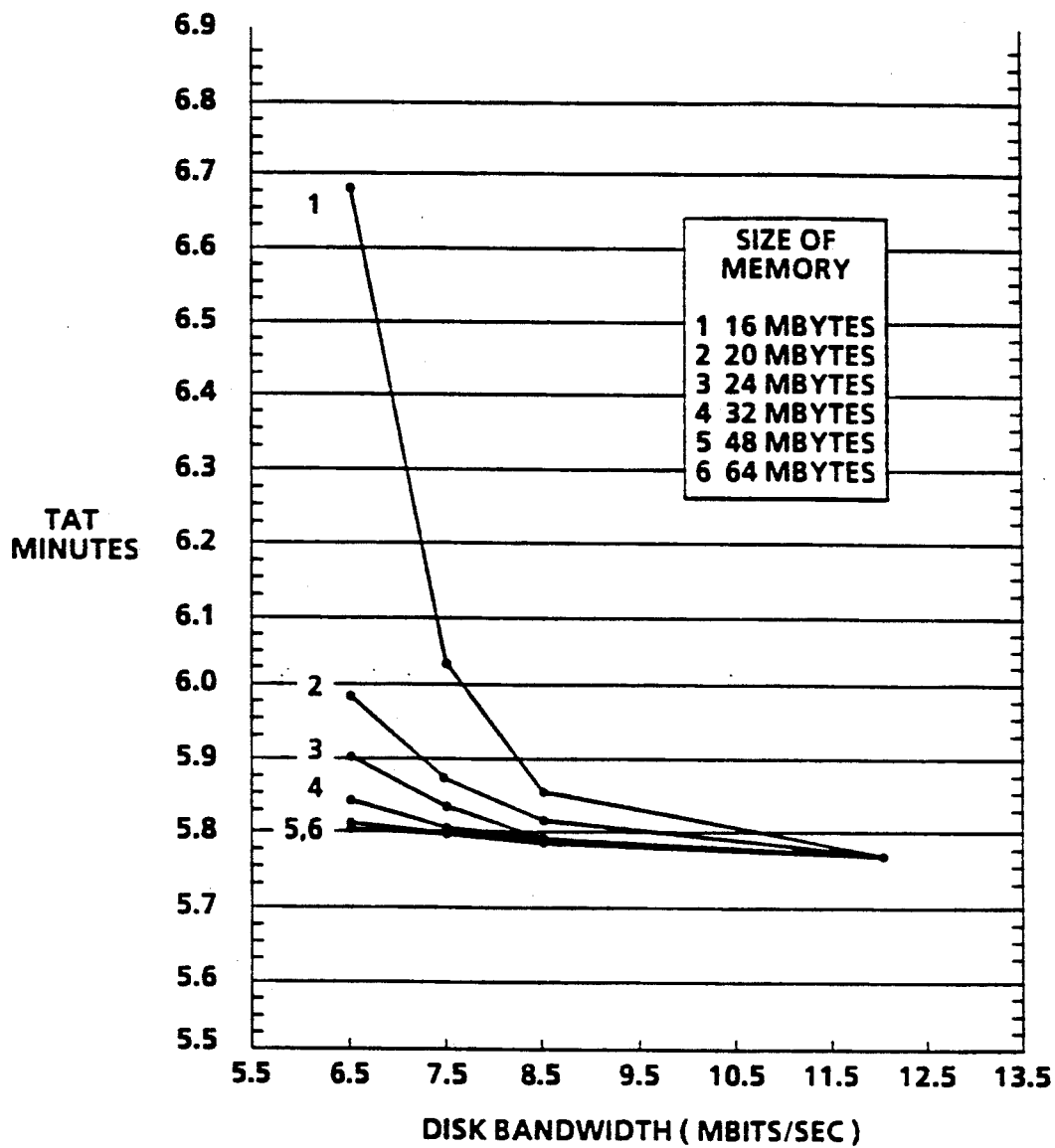
FIG. 24 is a graph comparing turn-around time in minutes with disk bandwidth and megabytes per second for various sizes of memory.

The electronic reprographic (ER) system under scrutiny is a single Electronic Sub System (ESS) which utilizes a rigid disk for archival and temporary storage of images in compressed bit map form. Naturally the ESS has a certain amount of fixed memory which it can use to temporarily store images, and an effective disk bandwidth through which it can retrieve or store images on the disk. Although for any given run of the model the ESS has a fixed amount of memory and disk bandwidth, both of these variables are adjustable. The fact that these two variables are adjustable allows us to make comparisons of the system performance for similar but distinct implementations of the architecture. These sample points, in turn, allow us to build the disk bandwidth/memory tradeoff curves See FIGS. 22-24.

The motivation for such an assessment is that given a certain set of fixed resources, in this case the size of memory and the disk bandwidth, some memory management schemes will outperform other memory management techniques. The key system parameters which inherently affect system performance are the size of memory, the disk bandwidth, the resource management, and memory swapping routines.

Both average turn around time (TAT) and the percentage of print pitch skips are used as criteria to measure the performance of the resource management algorithms. Average TAT is defined as the average duration of time it takes to complete the scanning/printing of a set of jobs including the time it takes to program, load, scan, print and unload the jobs from the system in addition to any waiting time incurred because the system or operator was busy. Turn around time for a single job is specifically measured as the time duration from when the particular job arrived to the operator for work until the job was removed from the system by the operator.

The second performance measurement is the percentage of print pitch skips generated by the system. A single print pitch skip occurs during the printing of a job when the ESS cannot provide the required print image to the IOT at the specified print time for that particular image. Each pitch skip encountered represents a period of time when the IOT engine, although in operation, is not producing any hard copy output. The percentage of print pitch skips is calculated as the total number of print pitch skips divided by the total number of impressions made plus the total number of print pitch skips.

For the current study performance is assessed for systems having 16, 20, 24, 32, 48, and 64 Mega Bytes of memory coupled with a rigid disk whose transfer rate (not including average rotational latency nor average seek durations) is either 6.5, 7.5, 8.5, or 12 Mega bits per second. For each disk transaction an additional average overhead cost was included in the effective transfer rate to account for average rotational latency and average seek duration. This results in a combination of twenty-four distinct ER system configurations. The twenty-four configurations are modelled for each memory management algorithm. Jobs are generated from a 4×7 RBG 200K planning matrix and simulated to represent a volume of approximately 350K prints per month.

4. Discussion

Memory Management routines effect Performance in certain situations. However, under certain conditions even these parameters play a minor role in determining system performance. The scheme for allocating resources is trivial when the number of originals is small. In this case all of the originals can reside in memory simultaneously, thereby allowing the print engine to run at top speed without incurring any print pitch skips.

Another case when the allocation of resources is trivial and the disk bandwidth is relatively unimportant is when the number of prints per original is equal to one. In this case originals are scanned and placed into memory, and a request is sent to the disk for temporary storage of the image. Although only one print per original is required each image upon being scanned is subsequently stored to disk in case an error in the system causes the need for one or more images to be reprinted. Only after a page is successfully saved onto the disk and printed may it be deleted from memory in order to increase available memory. The scanning of a page takes place when there is enough memory available for that function. Scan skips are incurred until there is an ample supply of available memory for the scanning operation. Although the resource allocation is trivial, print pitch skips may occur if the disk bandwidth cannot keep pace with the scanning and printing of images.

Allocation of memory and disk bandwidth play an instrumental role in determining system performance when the number of prints per original is greater than one and all of the segments of a job cannot simultaneously reside in memory. The role of memory management and disk bandwidth allocation, provided that the level of fixed resources and information pertaining to the current job and system status are known, is to attempt to schedule disk and memory usage such that both the number of print pitch skips and TAT is reduced. This is accomplished by scheduling the required disk bandwidth and ESS memory for a specified group of images in advance.

The purpose of the spool disk is to act as a temporary storage medium for scanned images in compressed bit map form; consequently, originals need only be scanned once. Essentially the disk can be used as an extension of main memory, storing and retrieving images as deemed necessary by the memory manager. The manager could then use the available disk bandwidth in such a way as to insure that images are in main memory when desired by the output device. It could choose to remove images which are not required for some period of time in order to make way for images of higher priority.

In FIGS. 20 and 21 the results of the Most Recently Used Segment Swapping algorithm are detailed along with a comparison to the Most Recently Used Page Swapping algorithm. For the most limited configured system (Memory = 16 Mega Bytes, Disk Bandwidth = 6.5 Mega Bits per second) the Most Recently Used Segment Swapping algorithm reduces print pitch skips in nearly half from 12.27% to 6.30% and decreases average TAT by 1.8% from 6.803 minutes to 6.677 minutes. The reduction in skips and TAT is lessened as total main memory is increased; see FIGS. 22-23. The results also show that as the disk bandwidth is increased the productive affects of the Most Recently Used Segment Swapping algorithm are reduced; see FIGS. 23 and 24.

The tables shown in FIGS. 20 and 21 report the results of the Sequential Limited Segment Swapping algorithm and the comparison of this algorithm with the Most Recently Used Page Swapping Algorithm. For the most limited configured system modelled (Memory 16 Mega Bytes, Disk Bandwidth 6.5 Mega Bits per second) the Sequential Limited Segment Swapping algorithm reduces the percentage of print pitch skips in nearly half from 12.27% to 6.22%. TAT is reduced by 1.8% from 6.803 minutes to 6.677 minutes. The results also show that the difference in print pitch skips between the Sequential Limited Segment Swapping algorithm and the Most Recently Used Page Swapping algorithm are reduced as the disk bandwidth is increased from 6.5 Mega Bits per second to 12 Mega Bits per second.

The above description is intended to be illustrative, not limiting. It is evident that many alternatives, modifications and variations will be apparent to those skilled in the art. Various changes may be made without departing from the spirit and scope of the invention as defined in the following claims.

What is claimed is:

1. An Electronic Reprographic apparatus for concurrent scanning, processing and printing of a plurality of print jobs, comprising:

scanner means for scanning a set of original documents which comprises at least one job in the plurality of jobs;

storage means for storing image data of the scanned documents, said storage means including main memory means for storing image data for current processing and disk memory means for storing image data for subsequent processing, a storage capacity of the main memory means being less than a storage capacity of the disk memory means;

printer means for printing copies of the stored image data in the main memory means;

system manager means for controlling operation of the scanner means, storage means and printer means, and transferring image data between the main memory means and disk memory means; and resource manager means activated by the system manager means when the printer means requests image data not stored in the main memory means but stored in the disk memory means and when storage capacity of the main memory means is insufficient to accommodate the requested image data, the resource manager means determining which image data stored in the main memory means should be transferred to the disk memory means to accommodate the requested image data, the resource manager means maintaining print skips of the printer means within a predetermined range in determining the image data to be transferred.

2. The apparatus of claim 1, wherein the resource manager means includes long term scheduler means for scheduling the required storage capacity of the main memory means and the disk memory for the plurality of jobs.

3. The apparatus of claim 2, wherein the long term scheduler means reserves a predetermined amount of storage capacity to permit concurrent scanning and printing a job.

4. The apparatus of claim 2, wherein the long term scheduler means maintains print skips of the printer means within a predetermined range in scheduling the storage capacity of the main memory means.

5. The apparatus of claim 1, wherein the system manager means determines a print mode of a job, the print mode being one of a stream printing mode, a job printing mode and a hybrid printing mode.

6. The apparatus of claim 5, wherein the system manager means activates the resource manager means in response to the job printing mode and hybrid printing mode.

7. The apparatus of claim 2, wherein the long term scheduler means includes offset means for scheduling a predetermined offset time period between the time the printer means requests the image data corresponding to one document and the time the printer means prints the image data corresponding to the one document.

8. The apparatus of claim 7, wherein the predetermined offset time period equals a predetermined number of print pitches.

9. The apparatus of claim 8, wherein the predetermined number of print pitches is two.

10. The apparatus of claim 2, wherein the long term scheduler means includes advanced set scheduling means for scheduling an amount of storage capacity of the main memory means necessary to retrieve from the disk memory means the requested image data corresponding to at least one set of original documents prior to printing of the at least one set.

11. The apparatus of claim 10, wherein the advanced set scheduling means is a single set scheduling means for scheduling the necessary storage capacity for one set of original documents.

12. The apparatus of claim 10, wherein the advanced set scheduling means is a consecutive set scheduling means for scheduling the necessary storage capacity for two consecutive sets of original documents.

13. The apparatus of claim wherein the resource manager means transfers to disk memory image data corresponding to an original document that has been printed and stored in the memory means.

14. The apparatus of claim 13, wherein the image data corresponding to the original document is the image data consuming a largest amount of storage capacity relative to the storage capacity of the image data corresponding to the remaining original documents in the main memory means.

15. The apparatus of claim 13, wherein the image data corresponding to the original document is the image data consuming a smallest amount of storage capacity relative to the storage capacity of the image data corresponding to the remaining original documents in the main memory means.

16. The apparatus of claim 1, wherein the resource manager means transfers to disk memory image data corresponding to at least a segment of an original document that has been printed and stored in the main memory means.

17. The apparatus of claim 16, wherein the image data corresponding to more than one segment is transferred, the number of segments transferred being determined by the number of segments that can be retrieved from the disk memory means in a predetermined time period.

18. The apparatus of claim 17, wherein the predetermined time period is related to operation of the print means.

19. The apparatus of claim 1, wherein the resource manager means minimizes a time duration between arrival of a job at the printer means to removal of a job from the printer means.

20. A method for concurrently scanning, processing and printing a plurality of print jobs in an electronic reprographic system, comprising the steps of:

scanning a set of original documents which comprises at least one job in the plurality of jobs with a scanner;

storing image data of the scanned documents, said storage step including storing image data for current processing in a main memory and storing image data for subsequent processing in a disk memory, a storage capacity of the main memory being less than a storage capacity of the disk memory;

printing copies of the stored image data in the main memory with a printer;

managing the system by controlling the steps of scanning, storing and printing, and transferring image data between the main memory and disk memory;

managing resources when the printing step requests image data not stored in the main memory but stored in the disk memory and when storage capacity of the main memory is insufficient to accommodate the requested image data, by determining which image data stored in the main memory should be transferred to the disk memory to accommodate the requested image data, the step of managing resources including the step of maintaining print skips of the printer means within a predetermined range in determining the image data to be transferred.

21. The method of claim 20, wherein the resource management step includes a long term scheduler step for scheduling the required storage capacity of the main memory and the disk memory for the plurality of jobs.

22. The method of claim 21, wherein the long term scheduler step reserves a predetermined amount of storage capacity to permit concurrent scanning and printing a job.

23. The method of claim 21, wherein the long term scheduler step maintains print skips of the printer within a predetermined range in scheduling the storage capacity of the main memory.

24. The method of claim 20, wherein the system management step determines a print mode of a job, the print mode being one of a stream printing mode, a job printing mode and a hybrid printing mode.

25. The method of claim 24, wherein the system management step activates the resource manager step in response to the job printing mode and hybrid printing mode.

26. The method of claim 21, wherein the long term scheduler step includes the step of offset scheduling for scheduling a predetermined offset time period between the time the printer requests the image data corresponding to one document and the time the printer prints the image data corresponding to the one document.

27. The method of claim 26, wherein the predetermined offset time period equals a predetermined number of print pitches.

28. The method of claim 27, wherein the predetermined number of print pitches is two.

29. The method of claim 21, wherein the long term scheduler step includes the step of advanced set scheduling for scheduling an amount of storage capacity of the main memory necessary to retrieve from the disk memory the requested image data corresponding to at least one set of original documents prior to printing of the at least one set.

30. The method of claim 29, wherein the advanced set scheduling step includes a step of single set scheduling for scheduling the necessary storage capacity for one set of original documents.

31. The method of claim 29, wherein the advanced set scheduling step includes the step of consecutive set scheduling for scheduling the necessary storage capacity for two consecutive sets of original documents.

32. The method of claim 20, wherein the resource manager step transfers to disk memory image data corresponding to an original document that has been printed and stored in the memory means.

33. The method of claim 32, wherein the image data corresponding to the original document is the image data consuming a largest amount of storage capacity relative to the storage capacity of the image data corresponding to the remaining original documents in the main memory.

34. The method of claim 32, wherein the image data corresponding to the original document is the image data consuming a smallest amount of storage capacity relative to the storage capacity of the image data corresponding to the remaining original documents in the main memory.

35. The method to disk memory of claim 20, wherein resource manager step transfers image data corresponding to at least a segment of an original document that has been printed and stored in the main memory.

36. The method of claim 35, wherein the image data corresponding to more than one segment is transferred, the number of segments transferred being determined by the number of segments that can be retrieved from the disk memory in a predetermined time period.

37. The method of claim 36, wherein the predetermined time period is related to operation of the print.

38. The method of claim 20, wherein the resource manager step minimizes a time duration between arrival of a job at the printer means to removal of a job from the printer.

* * * * *

UNITED STATES PATENT AND TRADEMARK OFFICE
CERTIFICATE OF CORRECTION

PATENT NO. : 5,142,667
DATED : August 25, 1992
INVENTOR(S) : Richard R. Dimperio; Bob Ho; Abde Kapadia; Thomas G. Brucker It is certified that error appears in the above-identified patent and that said Letters Patent is hereby corrected as shown below:

Column 26:

Claim 13, line 11, after "claim" insert --1--.

Column 28:

Claim 35, line 27, delete "to disk memory";

line 28, after "transfers" insert --to disk memory--.

Signed and Sealed this

Thirtieth Day of May, 1995

Attest:

BRUCE LEHMAN

Attesting Officer

Commissioner of Patents and Trademarks